United States Patent
Beikirch et al.

(10) Patent No.: US 7,978,914 B2
(45) Date of Patent: Jul. 12, 2011

(54) IMAGE PROCESSING SYSTEM

(75) Inventors: Lars Beikirch, Pima (DE); Sergej Fedorenko, Petersburg (RU); Dittmar Schwarz, Dresden (DE); Joachim Ihlefeld, Dresden (DE); Lutz Wenert, Dresden (DE)

(73) Assignee: Baumer Optronic GmbH (DE)

( * ) Notice: Subject to any disclaimer, the term of this patent is extended or adjusted under 35 U.S.C. 154(b) by 704 days.

(21) Appl. No.: 10/597,554

(22) PCT Filed: Jan. 30, 2004

(86) PCT No.: PCT/EP2004/000831
§ 371 (c)(1),
(2), (4) Date: Mar. 24, 2008

(87) PCT Pub. No.: WO2005/073911
PCT Pub. Date: Aug. 11, 2005

(65) Prior Publication Data
US 2009/0129699 A1 May 21, 2009

(51) Int. Cl.
G06K 9/48 (2006.01)
G06K 9/40 (2006.01)
G06K 9/64 (2006.01)
G09G 5/00 (2006.01)

(52) U.S. Cl. ......... 382/199; 382/266; 382/279; 345/615

(58) Field of Classification Search .................... None
See application file for complete search history.

(56) References Cited

U.S. PATENT DOCUMENTS

| | | | |
|---|---|---|---|
| 4,910,786 A * | 3/1990 | Eichel | 382/199 |
| 5,151,953 A | 9/1992 | Landeta | |
| 5,796,868 A * | 8/1998 | Dutta-Choudhury | 382/199 |
| 6,064,768 A | 5/2000 | Hajj et al. | |
| 7,894,675 B2 * | 2/2011 | Wiedemann et al. | 382/199 |
| 2004/0047498 A1 * | 3/2004 | Mulet-Parada et al. | 382/128 |

FOREIGN PATENT DOCUMENTS

| | | |
|---|---|---|
| CA | 2 376 683 A1 | 12/2000 |
| EP | 0587301 | 3/1994 |

(Continued)

OTHER PUBLICATIONS

Paul R. Beaudet, Time and Space Multiplexing Focal Plane Convolvers, Proceedings of the Spie, Jan. 16, 1989-Jan. 18, 1989, pp. 90-98, XP009037462, vol. 1071, Optical Sensors and Electronic Photography.

(Continued)

Primary Examiner — Anand Bhatnagar
Assistant Examiner — Randolph Chu
(74) Attorney, Agent, or Firm — DeMont & Breyer LLC

(57) ABSTRACT

The invention relates to an image processing system for omnidirectional reading of optical patterns, for example of one-dimensional and two-dimensional codes.

One object is to provide an image processing system which ensures high resolution with rapid processing at the same time in order, in particular, to allow processing in video real time and to provide reliable identification of the image information, in particular reliable and low-error edge detection, segmentation and object association.

According to the invention, this is achieved by the use of a plurality of convolvers, which operate in parallel and/or using the time-division multiplexing method, for convolution of the digital image data, of a neighborhood processor (90) for reading and linking contour points (22), and/or of a statistical processor for reading a segment list.

33 Claims, 13 Drawing Sheets

FOREIGN PATENT DOCUMENTS

WO 9618158 6/1996

OTHER PUBLICATIONS

R. Massen et al., Real-time Symbol Extraction from Grey-level Images, Proceedings of the Spie, Nov. 17, 1987-Nov. 18, 1987, pp. 19-25, XP009037482, vol. 860, Real Time Image Processing Concepts and Technologies.

"Canadian Office Action for Canadian International Application No. CA 2,554,453", Jan. 17, 2011, Publisher: Canadian Patent Office, Published in: Canada.

International Preliminary Examination Report.

* cited by examiner

| NBD | 1 | 2 | 3 | 4 | 5 | 6 |
|---|---|---|---|---|---|---|
| 1 | | | 3,1 | | | |
| 2 | | | 3,2 | | | |
| 3 | | | 3,3 | | | |
| 4 | | | 3,4 | | | |
| 5 | | | 3,5 | | | |
| 6 | | | | | | |

| NBD | 1 | 2 | 3 | 4 | 5 | 6 |
|---|---|---|---|---|---|---|
| 1 | | | | | | |
| 2 | | | 3,2 | | | |
| 3 | | | 3,3 | | | |
| 4 | | | 3,4 | | | |
| 5 | | | 3,5 | | | |
| 6 | | | 3,6 | | | |

| Filter direction | Edge direction | X coordinate of the contour point 1 | Y coordinate of the contour point 1 |
|---|---|---|---|
| 0° | 90° | $x_i + \Delta\delta$ | $y_i$ |
| 90° | 0° | $x_i$ | $y_i + \Delta\delta$ |
| 45° | 135° | $x_i + 0{,}75 - \Delta\delta$ | $y_i + \Delta\delta$ |
| 135° | 45° | $x_i + \Delta\delta$ | $y_i + \Delta\delta$ |

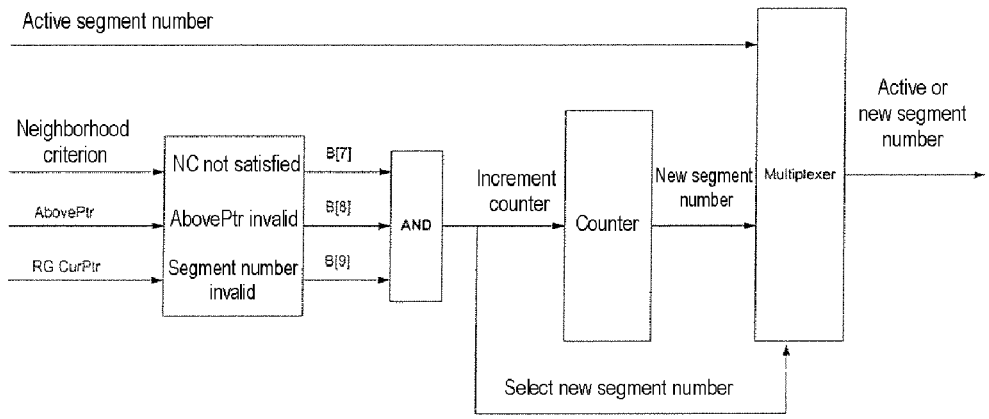

Fig. 21

| Clock | Out1 | Out2 | Data pipeline DP1 | | | Data pipeline DP2 | | |
|---|---|---|---|---|---|---|---|---|
| | | | Add1 | Mult1 | Acc1 | Out3 | $z^{-3}$ | Mult2 |
| 0 | P2 | P4 | | | | P3 | | |
| 1 | P1 | P5 | P2+P4 | | | P3 | | |
| 2 | P3 | P5 | P1+P5 | (P2+P4) CONV[2] | | P4 | | |
| 3 | P2 | P6 | P3+P5 | (P1+P5) CONV[1] | | P4 | P3 | |
| 4 | | | P2+P6 | (P3+P5) CONV[2] | (P2+P4) CONV[2] + (P1+P5) CONV[1] | | P3 | P3 CONV[3] |
| 5 | | | | (P2+P6) CONV[1] | | | P4 | P3 CONV[3] |
| 6 | | | | | (P3+P5) CONV[2] + (P2+P6) CONV[1] | | P4 | P4 CONV[3] |
| 7 | | | | | | | | P4 CONV[3] |
| 8 | | | | | | | | |
| 9 | | | | | | | | |
| 10 | | | | | | | | |

| Clock | Data pipeline DP3 | | | | | Decision unit | Contour point |
|---|---|---|---|---|---|---|---|
| | Acc2 | Out4 | Out5 | Acc3 | Acc4 | | |
| 0 | | P1 | P2 | | | | |
| 1 | | P5 | P6 | P1+P2 | | | |
| 2 | | P3 | P4 | P5+P6 | P1+P2 | | |
| 3 | | P5 | P6 | P3-P4 | (P1+P2)-(P5+P6) | | |
| 4 | | | | P5+P6 | P3-P4 | (P1+P2) - (P5+P6) > Grad_1 Threshold? | |
| 5 | GPx_0 | | | | P3-P4 | (P3-P4)           > Grad_2 Threshold? | |
| 6 | | | | | | | |
| 7 | GPx_1 | | | | | | |
| 8 | | | | | | GPx_1 - GPx_0 | |
| 9 | | | | | | GPx_1 - GPx_0   > Fx_Threshold? | |
| 10 | | | | | | | Valid or Invalid |

IMAGE PROCESSING SYSTEM

FIELD OF THE INVENTION

The invention relates to an image processing system in general, and to an image processing system for omnidirectional reading of optical patterns, for example of one-dimensional and two-dimensional codes, in particular.

BACKGROUND OF THE INVENTION

Image processing for automatic pattern recognition is currently one of the most demanding and excellent research fields. The potential applications are virtually unlimited.

Simple precursors of pattern recognition are the widely used laser scanner for detection of one-dimensional barcodes. However, digital image processing goes well beyond this since it can be used not only to identify one-dimensional barcodes, but also two-dimensional codes or complex images, in particular and in addition the structure which is unknown from the start as far as identification of how this is also made possible by the eye in conjunction with the brain.

One possible application, for example, is the identification of a code which is applied at an undefined point to a motor vehicle in the production line, in order to allow the production process to be comprehensively controlled and monitored. Since the codes are relatively small in comparison to the cars, and can be applied at different points, this application is extremely demanding with respect to the required quality and resolution. However, the different illumination in a production line also results in considerable difficulties for image identification. This is associated with ever more stringent demands for the processing speed.

Image processing systems are typically based on a digital two-dimensional image which is produced, for example, by a CCD camera. The two-dimensional images which are produced by the camera and can be processed further digitally are then passed to the pattern recognition. However, other imaging systems, for example X-ray CT scans, MRI scans or scanners can also be used, to name but one possible choice.

The actual identification of an image, that is to say the identification of structures of which the image is perceived to be composed, is a complex process. One fundamental idea in this case is that an image can be broken down into graphical basic structures which, in their totality, represent the image. These basic structures are in the simplest case straight lines or curved lines, although they may also be of a more complex nature. Basic structures such as these are also referred to as graphical primitives.

In this context, the identification process can be split into at least two phases. Firstly, pixels which can in principle be associated with a basic structure are found, and secondly pixels which have been found and belong to the same basic structure are combined in order to actually determine the shape, position, size etc of this basic structure.

More specifically, the image information is typically in the form of a brightness distribution and, possibly, a color distribution in the image, as well. For the sake of simplicity, the following text refers only to monochrome processing, but it is obvious that the processing can also be carried out in a corresponding manner for different color components of the image. First of all, the two-dimensional digital image is assumed, that is to say a discrete matrix of pixels, which is produced by the camera. In the matrix, each pixel contains at least one brightness value. Furthermore, it is assumed that the image information can be broken down into simple objects which are bounded by lines or edges which are defined by a particularly high brightness gradient, frequently also referred to as a discontinuity.

In order to determine these lines or edges, it is therefore first of all necessary to determine those pixels which are located at a point with a particularly high brightness gradient. This is done, for example, by scanning the brightness value in the image information along a predetermined direction, in order to track the discontinuity.

The discontinuity points which have been found in this way are then associated with one specific edge. The basic structures determined in this way finally represent the sought discontinuity edges, which represent a schematic form of the image content. This procedure is referred to as edge detection.

One possible way to approach this problem is to scan the brightness or to determine the brightness function along one direction. The function is then differentiated and subjected to a threshold value analysis. If the threshold value is exceeded at a point, then it is assumed that an edge is present at this point.

One such method is known from U.S. Pat. No. 4,910,786 (Eichel), which detects intensity edge paths as follows.

The gradient magnitude and direction of the image are determined in a lattice composed of node points by means of Gaussian network operators. The decision as to whether a node point is associated with an edge path is made on the basis of the gradient magnitude.

Evaluation of the gradient magnitude just by a threshold value comparison is disadvantageous in particular because the edge location is heavily influenced by noise and the local illumination level. The contact points that are found must be postprocessed in a complex form, and the processes which are required for this purpose considerably restrict the scope for a real-time capability.

Furthermore, in this method, the resolution is restricted by the image matrix, so that the resolution is inadequate for many fields of application. On the other hand, major refinements of the image matrix in order to increase the resolution cannot be carried out indefinitely, either, since the processing time would otherwise explode.

The described method is therefore disadvantageous and, in particular, is barely suitable for use in the demanding exemplary embodiment described above in the field of motor vehicle production. However, many other applications, such as precise edge measurements, can also be carried out only to a restricted extent in this way.

In addition, newer methods are known in which the resolution of the camera image is increased by pixel interpolation. However, these methods are generally software based and are therefore generally too slow in order to carry out processing in video real time with appropriately high resolution. Furthermore, subsystems such as these are unreasonably complex. In addition, the processes that are used cannot be transferred directly to hardware solutions.

GENERAL DESCRIPTION OF THE INVENTION

One object of the present invention is therefore to provide an image processing system which ensures high resolution with fast processing at the same time, in order in particular to allow processing in video real time.

A further object of the invention is to provide an image processing system which ensures reliable identification of the image information, in particular reliable and low-error edge detection and segmentation, as well as efficient object association and efficient compression of the image information.

Another object of the invention is to provide an image processing system which is cost-effective, and which in particular can be manufactured in series production.

Yet another object of the invention is to provide an image processing system which avoids or at least reduces the disadvantages of known solutions.

The object of the invention is achieved just by the subject matter of the independent claims. Advantageous developments of the invention are defined in the dependent claims.

According to the invention, an image processing system is proposed which is aimed in particular at omnidirectional reading of optical patterns, for example one-dimensional and two-dimensional codes. The image processing system according to the invention is, however, even suitable for carrying out image identification on complex objects.

The image processing system comprises an imaging system, for example a CCD camera, a scanner or a CT scanner, etc. for provision of an image datastream, which is initially in analog form. In this case, the image datastream can also be recorded by a plurality or large number of cameras (for example stereo systems, 3D processing, robot control, facet eye). The analog image datastream produced by the imaging system is then converted by means of an analog/digital converter to digital image data, to be more precise to a digital image datastream. An illumination device is preferably also included, in order to achieve matched illumination of the image.

The digital image datastream is also further processed by a digital processing device or unit, with the processing device comprising a pipeline processor and a computation device, or a microcomputer, inter alia with means for edge detection.

The core of the image processing system is a plurality of convolvers or convolution components which operate in parallel and/or using the time-division multiplex method, and which carry out convolution operations on the incoming digital image datastream. For this purpose, gray-scale value profiles are first of all produced from the image datastream, and are convolved. In particular, the convolvers carry out a cross-correlation process on the image data, with a convolution core with a zero mean value being used for this purpose.

In particular, the parallel hardware-based processing has made it possible to achieve a breakthrough in the processing speed. It is thus possible to carry out processing in video real time by use of the method according to the invention.

The digital image data is preferably convolved by means of the hardware convolvers in parallel in time and/or using the time-division multiplexing method with the image datastream representing an at least two-dimensional image, and the convolvers operating in parallel in time, in different directions.

Furthermore, the image processing system preferably has an edge detection unit for each direction or scanning direction, with each edge detection unit having at least one hardware convolver. In this context, scanning in each of four directions rotated through 45° with respect to one another has been found to be an advantageous compromise between hardware complexity and identification quality, so that four edge detection units are used in this case, and four separate convolvers are provided, operating in parallel in time. In particular, gray-scale profiles are produced and cross-correlated in parallel for each scanning direction in order to define their point of inversion as a zero point for the cross-correlation.

Furthermore, the incoming image datastream is preferably convolved in pairs in each edge detection unit, with the two convolvers in one pair operating in the same direction. In other words, one convolver pair is provided for each direction.

According to one particularly preferred exemplary embodiment, each gray-scale profile comprises n pixels which are adjacent along the scanning direction. This results in a 1×n environment. Furthermore, the convolution of the first n−1 pixels of each gray-scale profile and of the last pixels or n−1 pixels shifted by one is carried out in pairs, so that one first and one second convolution result is in each case calculated for each n×n environment and for each direction. It has been found to be particularly advantageous to operate within a 6×6 environment for this purpose.

The incoming digital image datastream is thus convolved within an n×n, in particular 6×6 environment, in the processing device which, in particular is a preprocessing unit, in a first main process by means of a plurality of pairs, in particular four pairs, of convolvers which operate in parallel in time and operate in four directions which are in each case rotated through 45°. This shifted convolution in pairs allows a wide range of options for further processing, as will be explained in the following text.

Contour points are then produced and a decision-making component is used to decide whether the respective contour point is valid or invalid. The subset of valid contour points produced in this way is then entered in a contour point list in a contour point memory. One contour point list is in consequence produced in each case for each direction.

The decision as to whether a contour point is valid or invalid is in this example made as follows. First of all, operands are determined by means of the convolution results of the convolvers, for a logic decision. The image processing system also has at least one decision unit, to be more precise, each edge detection unit has in each case one decision unit, which produces a logical variable as a function of the convolution results or operands. The contour point is classified as valid or invalid as a function of the logical variable, and is entered in the contour point list if it is valid.

The logic decision as to whether a contour point is classified as valid is preferably made as follows.

The logical variable is represented by a Boolean vector with a plurality of logical variables. A first of the logical variables $B[1]$ depends on the difference between the convolution results associated with one convolver pair exceeding an absolute magnitude threshold value. A second of the logical variables $B[2]$ depends on a mathematical sign difference between the convolution results associated with one convolver pair, and a third of the logical variables $B[4]$ depends on whether one of the convolution results associated with one convolver pair is equal to zero. The valid/invalid decision is then made as a function of a logic operation on the first, second and/or third logical variables, and the contour point is entered in the contour point list.

In particular, the logical operation is in the form of a Boolean operation $B[1]$ AND ($B[2]$ OR $B[4]$) and the contour point is entered in the contour point list when the result of the logical operation is TRUE.

In other words, a contour point is entered in the contour point list only when a) the convolution result of the operands which are associated with one convolver pair has different mathematical signs and the difference between the operands in the predetermined direction exceeds a threshold value, or when b) one and only one operand is equal to zero and the difference between the operands in the predetermined direction exceeds a threshold value.

The use of the three logical variables mentioned above has in its own right been found to be a reliable decision criterion. However, further variables are preferably used for decision-making purposes, thus further increasing the reliability. A total of six Boolean variables are used in practice, with the others depending, for example, on a contrast value and a further gradient exceeding a threshold value.

The contrast value is determined, for example, as the difference between the sum of the respective two outer pixels of the 1×6 environment used for the convolution process. Another option for definition of the contrast value is, for example, the difference between the convolution results. However, the contrast value is not only used as a further decision-making criterion for the validity of a contour point, but, if it is classified as being valid, the contour point is entered in a memory, at least with the contrast value associated with the values X position, Y position. The contrast value is advantageously also used later for determination of a neighborhood criterion.

This completes the first main process.

A further aspect of the invention is the use of a neighborhood processor, which reads and links the contour points.

This linking process is part of a second main process, which is carried out at a time after the first main process. In this case, the contour points (P(X,Y, contrast value)) of adjacent lines and/or columns are read by the neighborhood processor, are then linked in order to satisfy a neighborhood criteria, and are once again entered in a contour point list.

In particular, the neighborhood criterion is determined as a function of the contour point separation and/or the contrast values of the adjacent contour points. This classification on the basis of distance and/or contrast or gray-scale value has been found to be particularly suitable for identification of cohesive and separate objects as such.

A further embodiment of the invention is based on the creation of a segment list as a contour point list to which at least one segment number is added.

Object association is preferably carried out on the contour points as well, in the processing device.

For this purpose, the segment list is read by a statistical processor in a third main process, which is carried out at a time after the second main process. The statistical processor calculates statistical moments for the objects, in particular statistical moments for the objects in each direction.

The statistical moments are preferably calculated as far as the second, third and/or fourth order, in particular for the objects in each direction.

All of the processing can be carried out in video real time, since the image data is supplied as an image datastream to the processing device, and the contour point list is actually produced while the image datastream is being supplied.

In particular, a separate contour point list is created in each scanning direction. To be more precise, the contour point lists are stored in one or more memories for the running time of the image and they are sorted on the basis of directions and are stored in a partition form when the contour point memory is read again, before processing by the neighborhood processor. (As described below).

One major advantage of the image processing system according to the invention is, however, also based on the fact that a pixel interpolation process can be carried out in order to reduce the digitization noise, thus achieving a resolution which is better than the resolution of the image produced by the camera. In other words, sub-pixel resolution is achieved, and the contour points are stored with sub-pixel resolution in the contour point list. This has not been possible until now, in particular with the known threshold value methods.

According to one further preferred embodiment of the invention, at least one gradient is also calculated for each scanning direction, and is preferably stored in the contour point list. The gradient or gradients corresponds or correspond in particular to a contrast value in the scanning direction, and may be used as a measure of the quality of the contour point, and as a neighborhood criterion.

Furthermore, the difference between the two convolution operations in the same direction, and shifted by one pixel in the scanning direction, is calculated as a decision criterion for entry of a contour point in the associated contour point list.

In particular, a gradient or a plurality of gradients and the difference between two convolution results are calculated in the respective filter direction with respect to the delay time of the image, and at least one of the gradients and/or said difference is stored as a contrast within the contour point list. The contents of the contour point list are then copied to a first memory for each direction.

The first memory is preferably an external memory with respect to the first processing device in which case the contents of the contour point list are copied from the processing device for each direction and after each line of the imaging system to the first memory.

The contour points are preferably also segmented in the processing device.

According to one development of the invention, an interface of a data storage unit for this purpose copies the current line from the contour point list, after processing progress of the neighborhood processor, separately on the basis of directions to a second memory, to be more precise to a general purpose memory of the neighborhood processor.

The neighborhood processor preferably then uses a neighborhood criterion to define neighborhoods of the contour points, segments the contour points and/or enters the segment numbers and coincidences in an extended contour point list. The neighborhood criterion of contour points is calculated by the distance and the contrast comparison. By way of example, the Euclidean distance or else some other distance measure is used as the distance measure.

Furthermore, a statistical processor preferably calculates statistical moments on the basis of the contour point list.

The data obtained in this way, specifically the scanning direction, the statistical moments, the size of the environment and the gradient or contrast are now output via an output interface in the following output format [Direction (DIR), Moment (S), Segment number (SegNo), Contrast (CONT)].

The invention will be explained in more detail in the following text using exemplary embodiments and with reference to the drawings, in which identical and similar elements are in some cases provided with the same reference symbols.

BRIEF DESCRIPTION OF THE FIGURES

In the figures:

FIG. 20 shows a block diagram of the segment number generator, FIG. 21 shows a hardware calculation of the validity of a contour point in the edge detection unit and the decision unit shown in FIGS. 12 and 13, broken down on the basis of the processor clock cycle.

DETAILED DESCRIPTION OF THE INVENTION

Figure 23:
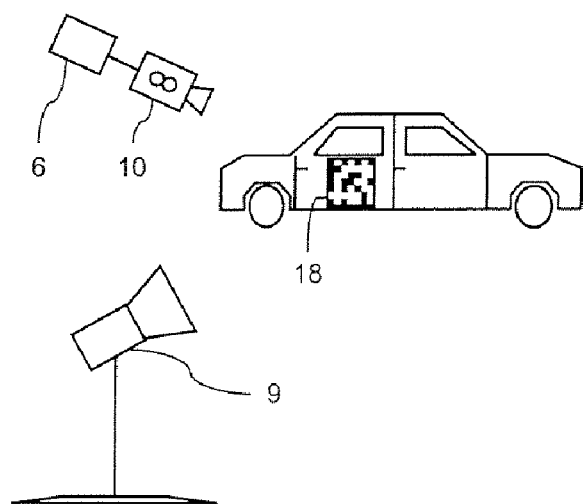
FIG. 23 shows a schematic illustration of the image processing system with a code to be identified on a motor vehicle.

The omnidirectional image processing system 1 (FIG. 11) according to the invention, or the code reader, comprises an imaging system 2, an analog/digital converter 4, a digital processing device 6, a computation device 8, a microcomputer which is not shown, and an optional illumination device 9 (FIG. 23).

Figure 1:
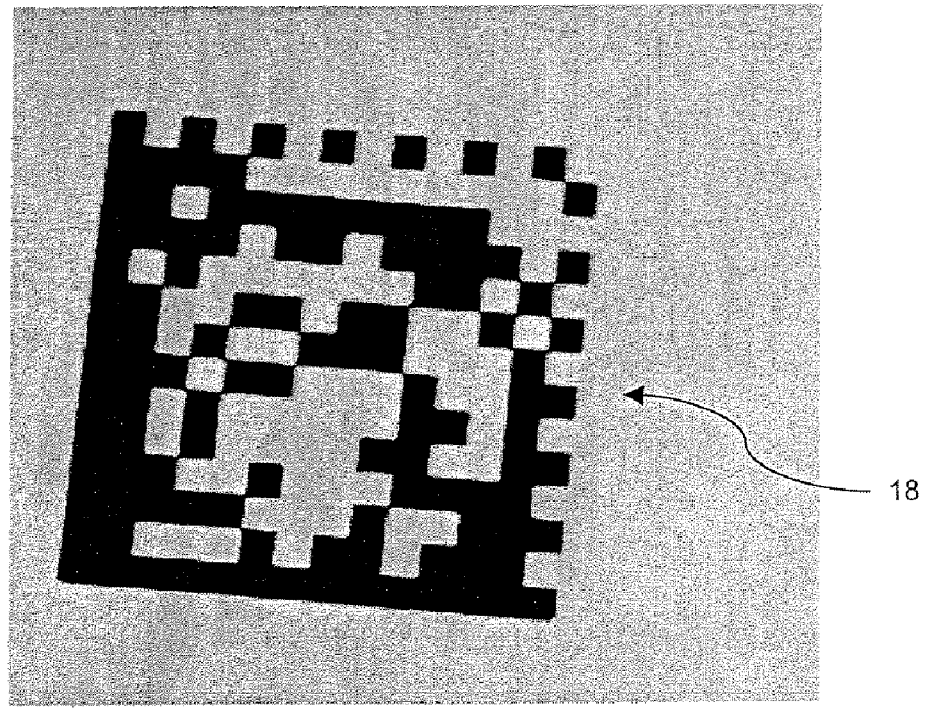
FIG. 1 shows a gray-scale image of a two-dimensional data matrix code.

In the following exemplary embodiment described in detail, the operation will be explained on the basis of a digital CCD matrix camera 10. This camera 10 represents an exemplary embodiment of the imaging system 2 and of the analog/digital converter 4 and produces digital image data, in the form of a digital image datastream 12 continuously or on a triggered basis. However, the imaging system 2 may also be a scanner, a CT scanner or the like, for example even an arrangement of a plurality of imaging systems. The image data is shown in the form of gray-scale image in a two-dimensional illustration in FIG. 1. Based on this example, FIG. 1 shows a slightly rotated data matrix code 18 which is intended to be decoded.

First Main Process

Figure 6:
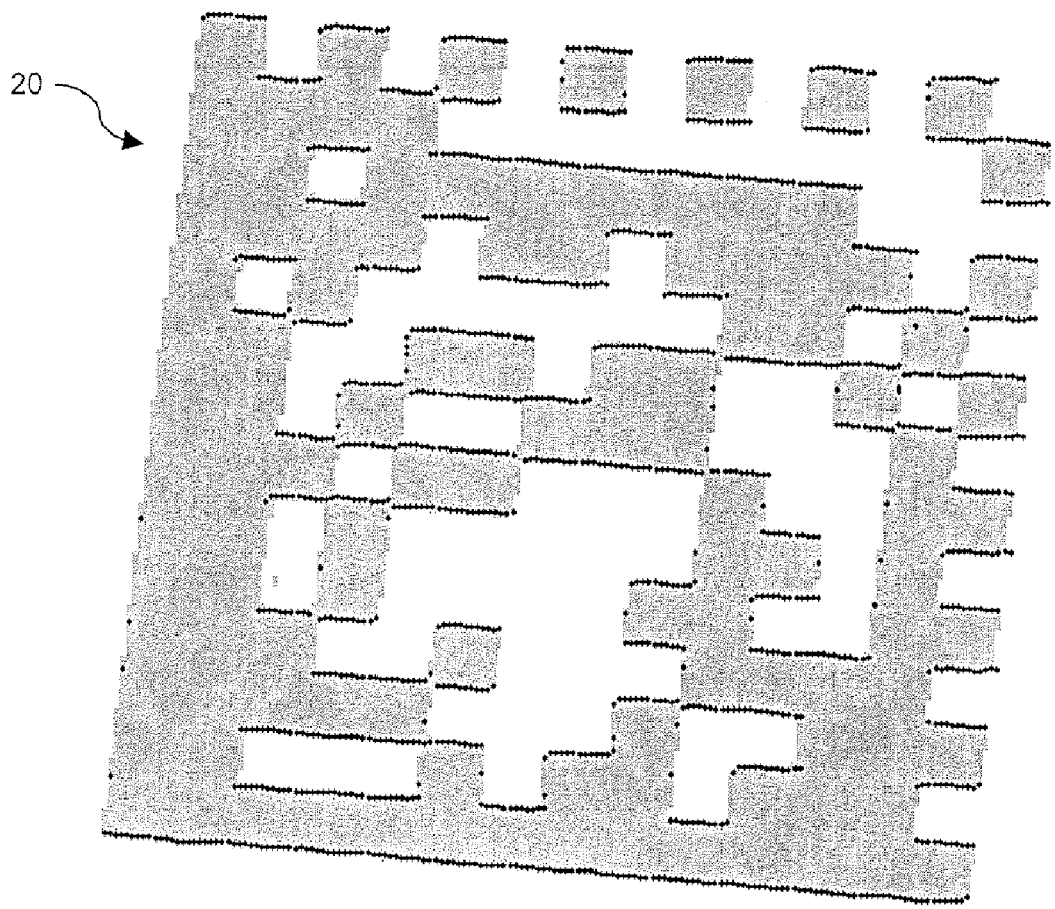
FIG. 6 shows an illustration, in the form of a graph, of the contour point list in the 90° direction.

According to the invention, a contour point list 20, which is shown in the form of a two-dimensional illustration in FIG. 6, is produced in video real time in a first main process or first processing step in the digital processing device or preprocessing unit 6. The digital processing device 6 is in the form of a pipeline processor.

Figure 2:
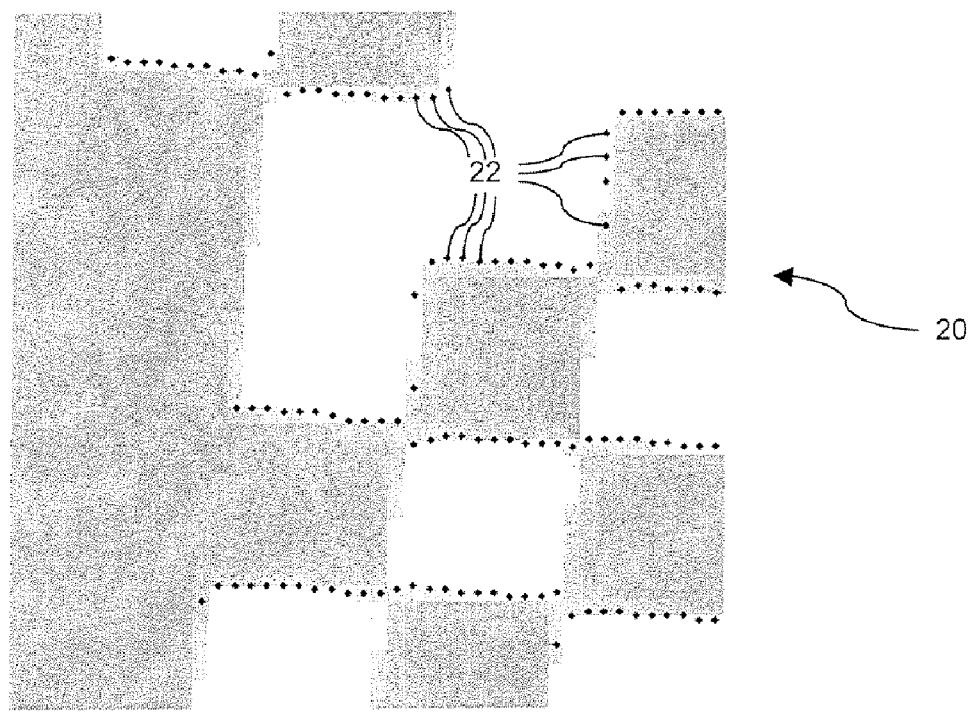
FIG. 2 shows an enlargement of a detail from FIG. 6.

FIG. 2 shows an illustration of a detail from the contour point list shown in FIG. 6.

The measurement accuracy of the contour point coordinates directly influences the approximation quality of the network on which the code is based, and thus the reading rate. The location of a contour point 22 is defined by the position of the point of inflection of the gray-scale profile, which is scanned essentially at right angles to the contour direction. According to the invention, the points of inversion of four gray-scale profiles are calculated for each pixel, at the angles 0°, 45°, 90° and 135°, in video real time with sub-pixel accuracy. The point of inflection is calculated via the zero point of the cross-correlation function from the gray-scale profile in the predetermined direction and with the normalized first derivative of the gray-scale profile of a typical edge, based on location, FIG. 4.

This will first of all be explained using the example of the 90° direction.

Figures 3, 4:
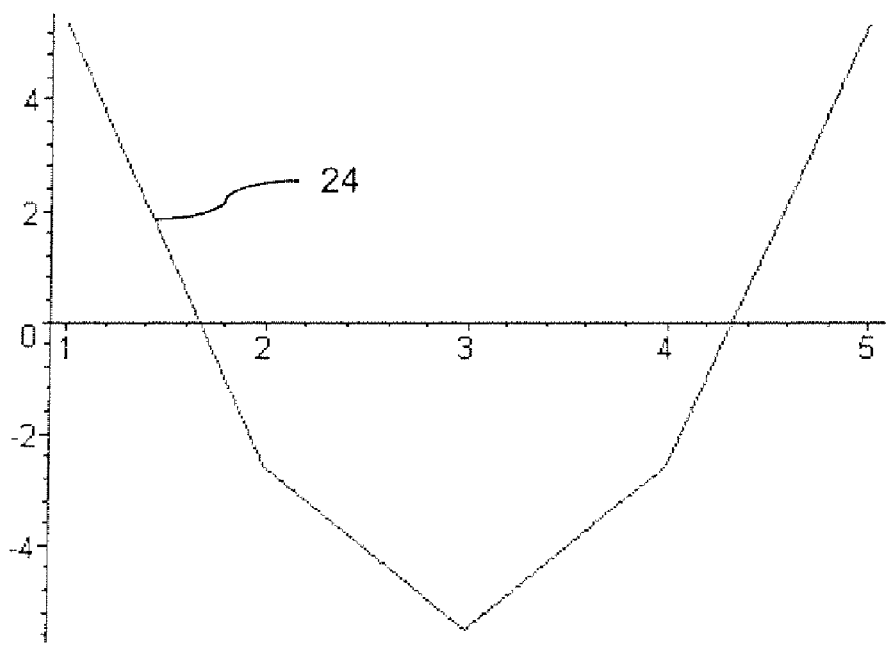
FIG. 3 shows a selection of an edge profile for the 90° direction in order to produce two gray-scale profiles for parallel convolution.
FIG. 4 shows an illustration, in the form of a graph, of the profile of the first derivative of a typical gray-scale profile based on location.

FIG. 3 shows the choice of an edge profile for the 90° direction corresponding to FIG. 2. The local 6×6 environment NBD (neighborhood) of a pixel is stored as an image element in a high-speed RAM, within which image element, as will be explained in the following text, a convolution process is carried out. A first gray-scale profile (GP) for the 90° direction is produced in synchronism with the pixels, from this using $$GP90\_0 := [NBD[3,1], NBD[3,2], NBD[3,3], NBD[3,4], NBD[3,5]]$$

and a second gray-scale profile, shifted by one pixel, is produced using $$GP90\_1 := [NBD[3,2], NBD[3,3], NBD[3,4], NBD[3,5], NBD[3,6]].$$

FIG. 4 shows an illustration in the form of a graph of the profile of the first derivative 24 of the typical gray-scale profile for the 90° direction, based on location. Examples of values for a convolution core with a zero mean value are, for example:

$$CONV := -5.50[-0.971, 0.471, 1, 0.471, -0.971].$$

The convolution core is in each case the same for the 0° and 90° as well as for the 45° and 135° scanning directions, and it may also be the same for all the scanning directions. The two convolution products F90_0 and F90_1 which are calculated in parallel in time are now calculated for the 90° direction as:

$$F90\_0 := \sum_{i=1}^{5} GP90\_0_i CONV_i = GP90\_0 \times CONV$$

$$F90\_1 := \sum_{i=1}^{5} GP90\_1_i CONV_i = GP90\_1 \times CONV$$

This calculation is known as a cross-correlation, with five pixel operators being used in this example. From the hardware point of view, hardware convolvers which operate in parallel in time or operate using the time-division multiplex method are used for this purpose in order to calculate two parallel convolution products F90_0 and F90_1, with the calculation in each case being terminated within the duration of one pixel.

Furthermore, the contrast $$CONT90 := NBD[3,1] + NBD[3,2] - NBD[3,5] - NBD[3,6]$$

and other functions which will be explained in the following text are calculated by hardware. Subject to the condition that the magnitude abs(CONT90) exceeds a contrast threshold, a list entry is produced in a hardware-based contour point list for the contour point CP[i], which is provided with the sequential index i.

$$CP[i]\_90 := [X, Y, CONT90]$$

The X and Y coordinates are obtained from the coordinates $x_i$ and $y_i$ of that pixel which is imaged onto the element NBD[3,3] in the 6×6 environment NBD.

In the example, the resolution of the X and Y coordinates has been extended by two bits in comparison to the original image, that is to say the resolution has been increased by a factor of four in each direction. This sub-pixel interpolation ensures an improved contour quality even in environments subject to interference, since on the one hand only local threshold values are used, and on the other hand the contour point is largely position-invariant in the depth of focus range of the objective.

Figure 5:
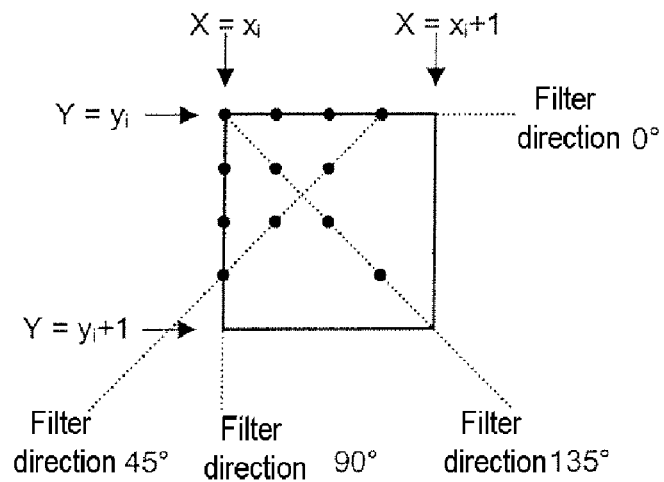
FIG. 5 shows an illustration of the length extension of the X and Y coordinates for sub-pixel interpolation.

FIG. 5 shows an illustration of the resolution extension of the X and Y coordinates for sub-pixel interpolation.

FIG. 6 shows an illustration in the form of a graph of the contour point list 20 in the 90° direction.

The contour point lists for the 0°, 45° and 135° directions are calculated in the same way as for the 90° direction, with x being used for the direction in the following text. The corresponding gray-scale profiles GPx_k, convolution products Fx_k, contrasts CONTx and contour point lists CP(i)_x where k=0.1 and x=0, 45, 135 are defined in accordance with FIG. 3 as follows:

$GP0\_0:=[NBD[1,3], NBD[2,3], NBD[3,3], NBD[4,3], NBD[5,3]]$ $GP0\_1:=[NBD[2,3], NBD[3,3], NBD[4,3], NBD[5,3], NBD[6,3]]$ $F0\_0:=GP0\_0 \times CONV$ $F0\_1:=GP0\_1 \times CONV$ $CONT0:=NBD[1,3]+NBD[2,3]-NBD[5,3]-NBD[6,3]$ $CP[i]\_0:=[X, Y, CONT0]$ $GP45\_0:=[NBD[2,5], NBD[3,4], NBD[4,3], NBD[5,2], NBD[6,1]]$ $GP45\_1:=[NBD[1,6], NBD[2,5], NBD[3,4], NBD[4,3], NBD[5,2]]$ $F45\_0:=GP45\_0 \times CONV$ $F45\_1:=GP45\_1 \times CONV$ $CONT45:=NBD[6,1]+NBD[5,2]-NBD[2,5]-NBD[1,6]$ $CP[i]\_45:=[X, Y, CONT45]$ $GP135\_0:=[NBD[1,1], NBD[2,2], NBD[3,3], NBD[4,4], NBD[5,5]]$ $GP135\_1:=[NBD[2,2], NBD[3,3], NBD[4,4], NBD[5,5], NBD[6,6]]$ $F135\_0:=GP135\_0 \times CONV$ $F135\_1:=GP135\_1 \times CONV$ $CONT135:=NBD[1,1]+NBD[2,2]-NBD[5,5]-NBD[6,6]$ $CP[i]\_135:=[X, Y, CONT135]$ In each case one pair of gray-scale profiles GPx_0 and GPx_1 is thus calculated for each direction x=0, 45, 90, 135, and in each case one pair of convolution products Fx_0 and Fx_1 is calculated by means of in each case one pair of convolvers which operate in parallel in time or using the time-division multiplex method.

The lists calculated in this way are stored in a RAM organized in such a way that the contour points are stored in lines in a sequence organized on the basis of their indices i.

The algorithm described above is carried out in real time, with respect to the incoming image datastream, by hardware in the processing device 6 as follows.

Figure 11:
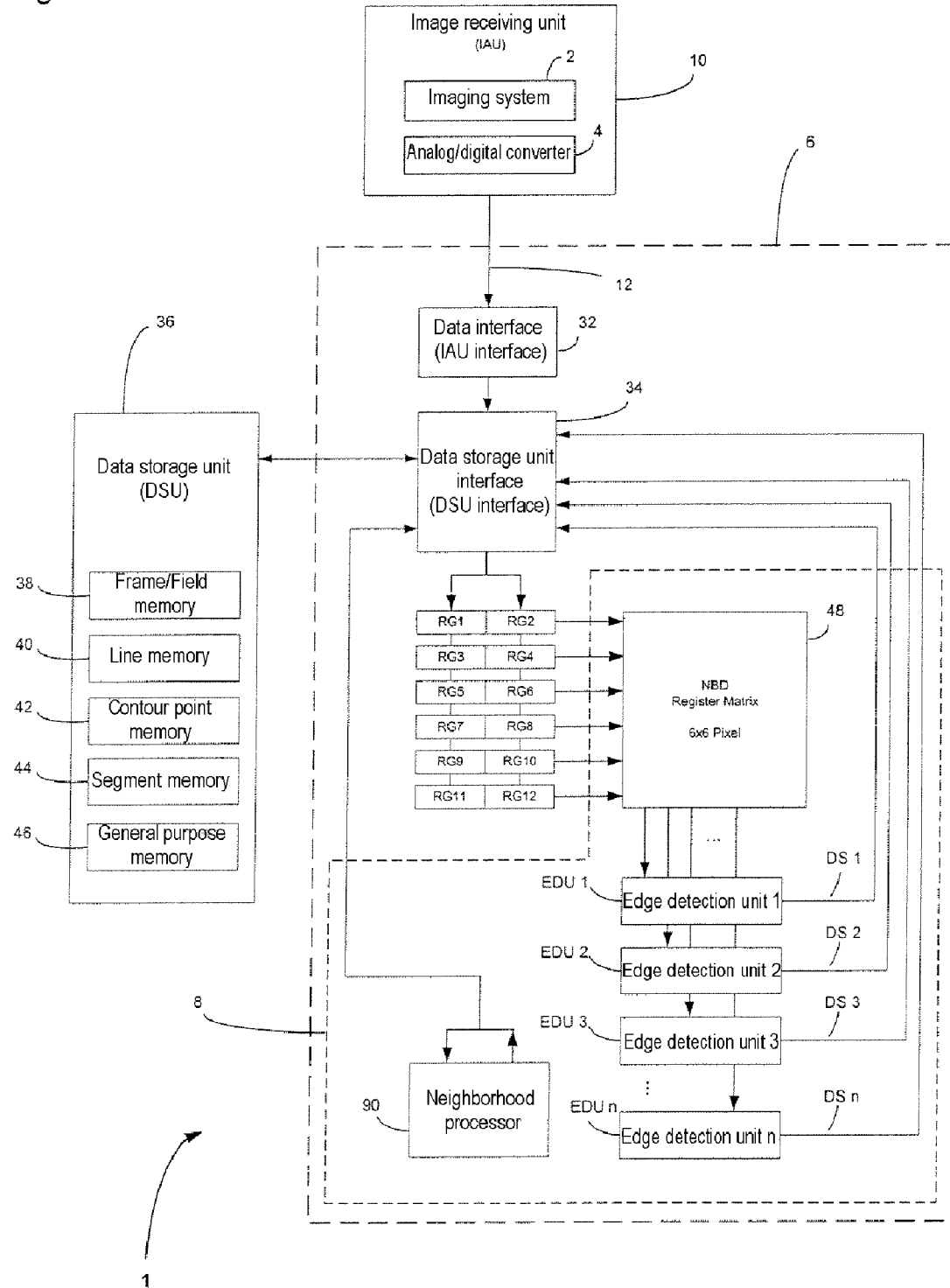
FIG. 11 shows a block diagram of the image processing system according to the invention.

FIG. 11 shows the design of the processing device 6 in the form of a block diagram.

The digital processing device 6 or preprocessing unit has a data interface 32, a memory interface 34, 12 registers RG1 to RG12 as well as a computation device 8. The figure does not show a digital microcomputer, for example a DSP or other standardized computer which can access the data storage unit 36.

The computation device 8 in turn comprises a register matrix 48, a plurality of n edge detection units EDU1 to EDUn and a neighborhood processor 90. A data storage device 36 is connected to the processing device 6 by means of the memory interface 34.

The image data in the image acquisition unit 10 (IAU) is transmitted in real time to the data interface 32 (IAU interface) of the preprocessing unit 6. The data interface 32 is connected to the memory interface 34 (DSU interface) to the external data storage unit 36 (DSU) and is able to make a plurality of, typically eight, write/read accesses to the RAM during the transmission time of one pixel. The data storage unit 36 has or comprises as modules the frame/field memory 38, the line memory 40, the contour point memory 42, the segment memory 44, and the general purpose memory 46. The modules 38 to 46 can be provided in a standard memory with a high data rate, or else in a plurality of memories of different speed.

One good memory architecture has or comprises three independent high-speed 16-bit memory modules, comprising one dynamic memory M1 (DRAM) and two solid-state memories M2 and M3 (SRAM). The association between the logic memories and the physical memories is described in Table 1. This architecture results in a data rate of 48-times the pixel rate. The image data and the contour point lists in each case represent larger matrices and are formatted in blocks in the memory interface 34, and are stored in real time in the dynamic memory M1.

TABLE 1

| Logic memory | Physical memory | Designation |
| --- | --- | --- |
| Frame/field memory 38 | DRAM | M1 |
| Line memory 40 | SRAM | M2 |
| Contour point memory 42 | DRAM | M1 |
| Segment memory 44 | SRAM | M3 |
| General purpose memory 46 | SRAM | M3 |

Furthermore, the current image datastream is likewise stored in the line memory M2 40, but in this case only with a reduced depth of six lines. The memory interface 34 reads a matrix of 2×5 pixels from the line memory 40, and writes the current pixel and the previous pixel as a 16-bit word to the line memory 40. This results in a datastream which contains two columns of the image matrix with a length of six pixels, and which is stored in the registers RG1 to RG12. The contents of this register are then shifted in lines in two clock cycles to the register matrix NBD 6×6 48. The register matrix 48 also contains a column which is required as buffer store, but is not shown.

The register matrix 48 is connected to the n edge detection units EDU1 to EDUn, with each edge detection unit being associated with one specific scanning direction. In the example described here, scanning is carried out along four directions, so that n=4.

In the structurally simplest case, the register matrix 48 is represented by 42 registers. Implementations with high-speed internal SRAMs are likewise possible.

The sub-pixel coordinates of contour points can be determined directly from the register matrix 48. For this purpose, the associated gray-scale profiles GP0, GP45, GP90, GP135 are first of all taken for the edge detection units EDU1 to EDU4 with the direction 0°, 45°, 90°, 135°.

The gray-scale profiles are defined as:

$$GP0:=[NBD[1,3],NBD[2,3],NBD[3,3],NBD[4,3],\\NBD[5,3],NBD[6,3]]$$

$$GP45:=[NBD[1,6],NBD[2,5],NBD[3,4],NBD[4,3],\\NBD[5,2],NBD[6,1]]$$

$$GP90:=[NBD[3,1],NBD[3,2],NBD[3,3],NBD[3,4],\\NBD[3,5],NBD[3,6]]$$

$$GP135:=[NBD[1,1],NBD[2,2],NBD[3,3],NBD[4,4],\\NBD[5,5],NBD[6,6]]$$

In this case, NBD is an abbreviation for neighborhood, as those skilled in the art will be aware. The general structure of each gray-scale profile is thus:

$$GP:=[P1, P2, P3, P4, P5, P6]$$

and thus comprises the gray-scale value of in each case six pixels P1 to P6.

Figure 12:
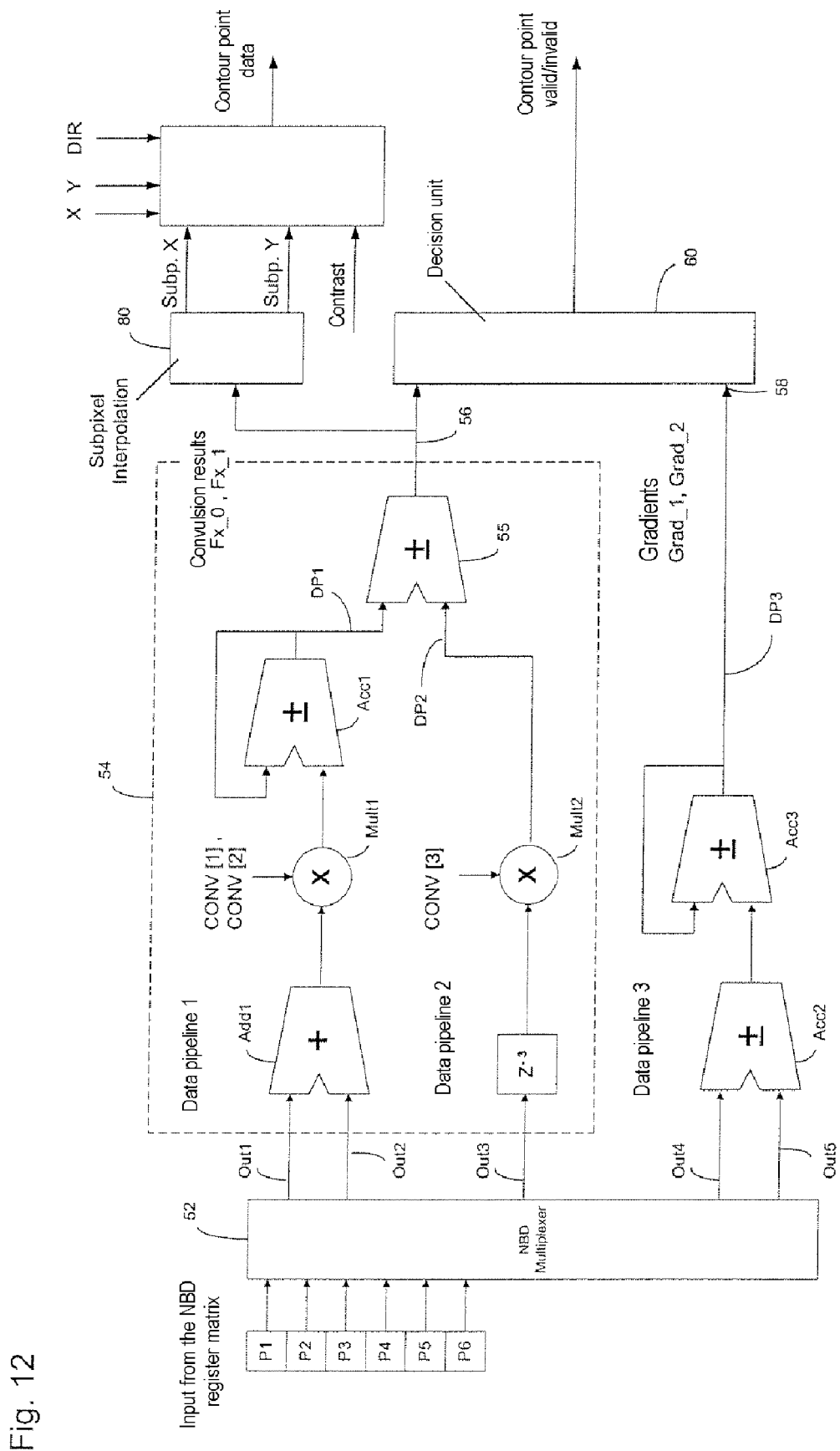
FIG. 12 shows a block of an edge detection unit according to the invention.

FIG. 12 illustrates in detail one of the four identical edge detection units, which operate in parallel.

The pixels P1 to P6 are passed from the register matrix 48 to the NBD multiplexer 52, with the six pixels being firmly linked to the inputs of an NBD multiplexer 52 of the edge detection unit for the respective direction, in this case EDU1.

The calculation is carried out by the edge detection unit EDU1 with the aid of a pipeline processor. The datastream is processed in the edge detection unit, that is to say without any branches, with the processing starting with the delay of six pixels, of course, for the 6×6 environment that is used, but with the procedure from here on being carried out in video real time.

The edge detection unit EDU1 has at least one hardware convolver pair 54, which are connected to outputs Out1 to Out3 of the NBD multiplexer 52, and which carry out the convolution operations in the datastream, in each case in parallel, for P1 to P5 and P2 to P6.

The two convolution products in pairs for one direction Fx_0 and Fx_1 (convolution results) are in this case calculated as follows within one pixel clock cycle and "on the fly" from the data P1 to P5 and P2 to P6 in the data pipelines DP1 and DP2, to be more precise in the convolver pair 54.

The clocking of the pipeline processor that is used as the basis for the edge detection unit EDU1 is illustrated in FIG. 21.

In the clock cycles Clock0 to Clock3, the data items P1 to P6 are written from the NBD multiplexer 52 to a first additional element Add1 of the convolver pair 54, with the first additional element Add1 being firmly linked to the outputs Out1 and Out2. Furthermore, in the clock cycles Clock1 to Clock4, the gray-scale value of the pixels which are symmetrical in pairs about the point of symmetry of the convolution core 24, that is to say P2 and P4, P1 and P5 for Fx_0 as well as P3 and P5, P2 and P6 for Fx_1, are added in the first additional element Add1 to give the first intermediate results P2+P4, P1+P5, P3+P5 as well as P2+P6.

In the clock cycles Clock2 to Clock5, the first intermediate results are multiplied in a first multiplier Mult1 by the associated values of the convolution core 24, specifically CONV[1] and CONV[2], and in the clock cycles Clock4 and Clock6 they are further added in a second additional element Acc1.

The data items P3 and P4 are read in a corresponding manner in the clock cycles Clock0 to Clock3 in the parallel data pipeline DP2, which is firmly linked to the output Out3 of the NBD multiplexer 52, and are multiplied in the clock cycles Clock4 to Clock7 by the point of symmetry CONV[3] of the convolution core 24 by means of a second multiplier Mult2.

Once again with reference to FIG. 12, the convolution results Fx_0 and Fx_1 are finally calculated in a further adder 55 by addition of the results obtained from the data pipelines DP1 and DP2 (the clocking is not illustrated in FIG. 21).

The convolution products Fx_0 and Fx_1 (convolution results) from the convolver pair are thus respectively produced at the output 56 of the convolver pair 54 and at the output of the data pipelines DP1 and DP2.

This method of calculation of the convolution results is made possible by the symmetry of the convolution core 24 and makes the calculation simpler than by carrying out five multiplication operations in each case.

It is obvious to a person skilled in the art, the calculation of the two convolution results Fx_0 and Fx_1 in pairs as described above in the pipeline processor of the edge detection unit EDU1, which for the purposes of this description is described as a calculation by means of a convolver pair, represents only one exemplary embodiment.

In parallel with the calculation of the convolution products Fx_0 and Fx_1 two gradients Grad_1 and Grad_2 are calculated within the same edge detection unit EDU1 along the gray-scale value profile in the data pipeline DP3, which is likewise connected on the output side to the NBD multiplexer 52, to be more precise being connected to its outputs Out4 and Out5, as:

$$Grad\_1:=P1+P2-P5-P6 \text{ and}$$

$$Grad\_2:=P3-P4$$

and produced at the gradient output 58.

The gradient Grad_1 corresponds to the contrast, and the gradient Grad_2 is used for artifact suppression. Both gradients are then subjected in a decision unit 60 to a threshold value test with a programmable threshold Grad_1 Threshold and Grad_2 Threshold respectively. The way in which this calculation is clocked is likewise illustrated in FIG. 21.

Figure 13:
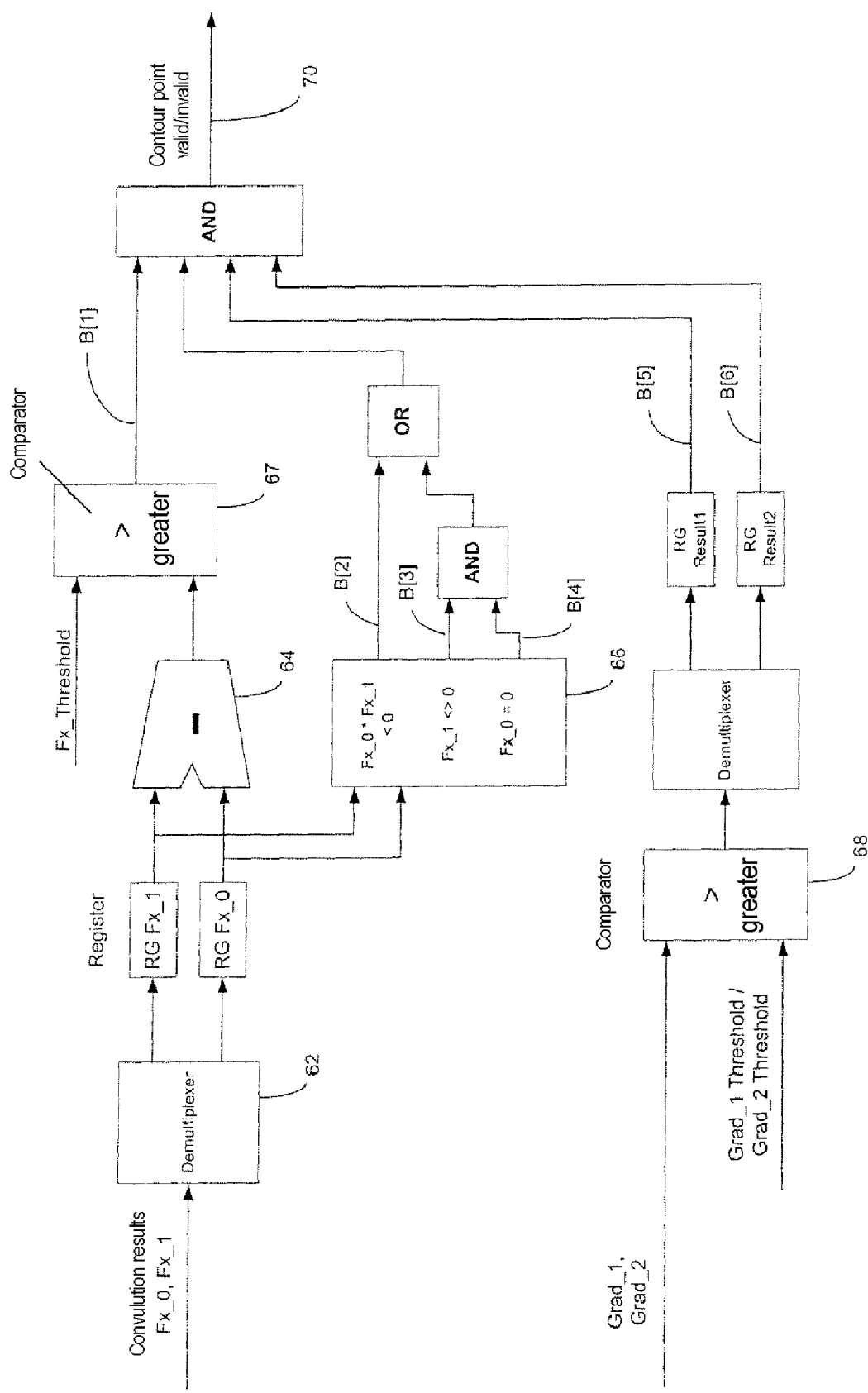
FIG. 13 shows a block diagram of a decision unit according to the invention.

The decision unit 60 or the decision-making process is illustrated in detail in FIG. 13.

The decision unit 60 synchronizes the input data and produces a logical variable for each pixel, in the form of a Boolean vector B[k], where k=1, 2, 3, 4, 5, 6:

$$B[1] = 1 \text{ when } abs(Fx\_0 - Fx\_1) > Fx\_Threshold = 0; \text{ else } B[1]$$

$$B[2] = 1 \text{ when } Fx\_0 * Fx\_1 < 0 = 0; \text{ else } B[2]$$

$$B[3] = 1 \text{ when } Fx\_1 <> 0 = 0; \text{ else } B[3]$$

$$B[4] = 1 \text{ when } Fx\_0 = 0 = 0; \text{ else } B[4]$$

$$B[5] = 1 \text{ when } abs(Grad\_1) > Grad\_1 \text{ Threshold} = 0; \text{ else } B[5]$$

$$B[6] = 1 \text{ when } abs(Grad\_2) > Grad\_2 \text{ Threshold} = 0; \text{ else } B[6]$$

The result of the Boolean vector thus depends on the convolution results, to be more precise on a total of six operands, which are calculated from the gray-scale value profile and the convolution results.

Thus, in other words, the logical variable B[1] depends on whether the absolute magnitude of the difference between the convolution products Fx_0 and Fx_1 of one convolver pair 54 exceeds the threshold Fx_Threshold. Furthermore, the logical variable B[2] depends on whether there is a change in the mathematical sign between the two convolution results Fx_0 and Fx_1 which are associated with one convolver pair 54. Furthermore, the logical variables B[3] and B[4] depend on whether the convolution result Fx_1 is not equal to zero and the convolution result Fx_0 is equal to zero.

For this purpose, the decision unit 60 has a demultiplexer 62 on the input side, which passes the convolution results Fx_0 and Fx_1 to two separate registers RG Fx_0 and RG Fx_1, respectively. From there, the results are passed to a subtractor 64 and to a logic unit 66, as well as a comparator 67 with a magnitude-forming input, in order to determine the values B[1] to B[4].

The variables B[5] and B[6] test for overshooting of the threshold value Grad_1 Threshold and Grad_2 Threshold of the gradients Grad_1 and Grad_2, respectively by means of a comparator 68.

This Boolean vector B[k] is used to calculate the result, to be precise the condition contour point valid/invalid (Contour_Point_valid=1 {TRUE}/0 {FALSE}), to be precise as Boolean operation:

$$\text{Contour\_Point\_valid} = B\{1\} \text{ AND } (B\{2\} \text{ OR } (B[3] \text{ AND } B[4])) \text{ AND } B[5] \text{ AND } B[6]$$

The corresponding contour point is entered in the contour point list when and only when the complete validity criterion is Contour_point_valid 70 TRUE.

However, simplified validity criteria, B[1] AND {B[2] OR B[3]} are also possible, of which the validity criterion Contour_Point_valid explained above represents a subset.

Figures 7, 8, 9:
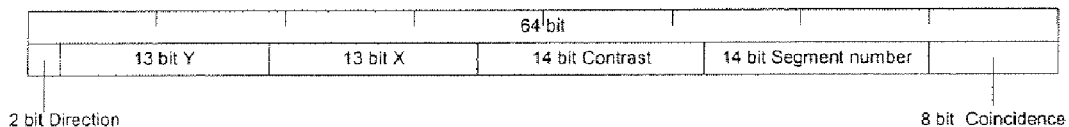
FIG. 7 shows the calculation of the coordinates with sub-pixel accuracy.
FIG. 8 shows the data structure of the contour point list.
FIG. 9 shows an example of a detail of a hexadecimal contour point list ("Hexdump")
Figure 14:
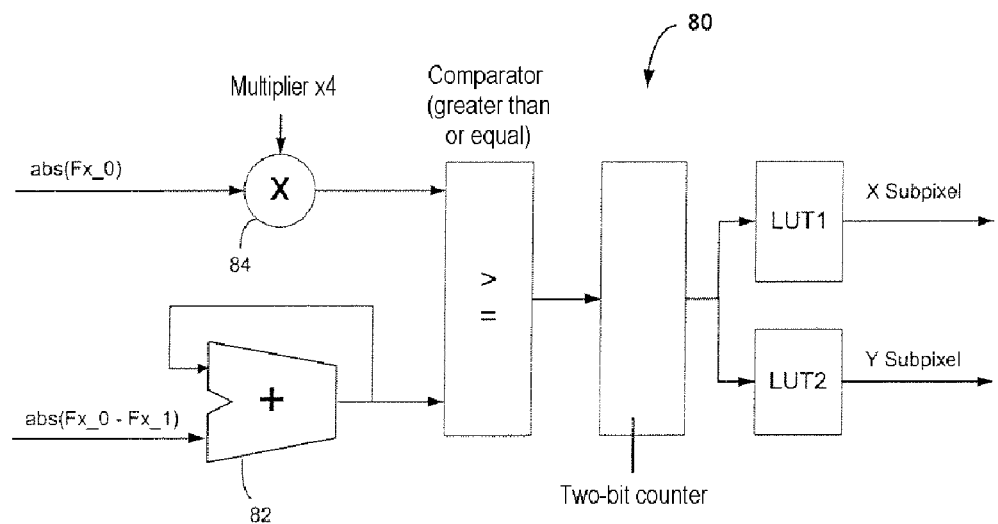
FIG. 14 shows a block diagram of a hardware divider.

A sub-pixel interpolation process is also carried out as shown in FIG. 7 and FIG. 14. The coordinates of the contour point along the scanning line are determined with sub-pixel accuracy from the values Fx_0 and Fx_1:

$$\Delta\delta := abs(Fx\_0/(Fx\_0-Fx\_1))$$

$\Delta\delta$ is required only with a short word length, for example 2 bits. This corresponds to a $2^2=4$-times sub-pixel interpolation process. It is therefore possible to use a simple, high-speed hardware divider 80. However, double or more than quadruple sub-pixel interpolation is also possible. The divider 80, which is illustrated in detail in FIG. 14, operates sequentially in a simple manner by accumulating the difference Fx_0–Fx_1 in the denominator in an addition element 82 until four-times the value of the counter is reached in a multiplication element 84.

The value $\Delta\delta$ in the tables LUT1 and LUT2 is then transformed to the high-resolution Cartesian coordinate system. During this process, offsets are taken into account by the digital network.

The sub-pixel-accuracy coordinates are calculated on the basis of the table illustrated in FIG. 7, and are entered in the contour point list as described above with the elements CP[i]:

$$CP[i] := [X[i], Y[i], CONT]$$

and are output to an FIFO within the memory interface 34, and are finally written in blocks to the memory M1. During this process, the values $x_i$ and $y_i$ correspond to the coordinates of the pixel which is mapped onto the element NBD[3,3] in the 6×6 environment NBD, taking account of the transformation to high-resolution Cartesian coordinate system. The contour point list 20 is stored organized in lines, so that a format which has typically been shortened to 32 bits is sufficient in this case, in which only the low part of the y coordinate is stored.

As is also shown in FIG. 11, a separate edge detection unit EDU1 to EDUn is provided for each direction. Data records which are transmitted to the memory interface 34 are produced at the output of each edge detection unit. The memory interface 34 buffers the data records DS1 to DSn associated with one direction, and stores the data records DS1 to DSn in a progressive sequence based on the FIFO principle in the memory M1. If a change occurs in the line address, the memory interface 34 adds a data record which marks the line change, in the same way as an end identification after the image end.

The storage of the contour point list 20 in the memory M1 completes the first step or main process of contour point generation.

Second Main Process

In the second main process, which is carried out at a time after the first main process, the contour point lists are now loaded line by line in the memory M3. As is shown in FIG. 8, the memory interface 34 expands the data in the contour point list CP[i] to the complete structure length that is now required for reading the information. The memory M3 is organized as a ring buffer with a typical memory depth of four lines, and has four independent buffers for the 0°, 45°, 90° and 135° directions. After identification of a line end marking, the writing process is in each case stopped, and the neighborhood processor 90 is started.

The current, most recently written line is written to the neighborhood processor 90. In contrast to the normally used neighborhood processor, which operates in the network, list data is processed using the sub-pixel format according to the invention. The neighborhood can be defined flexibly depending on the object to be achieved.

Good general validity is achieved by a neighborhood criterion NC which is formed by the simplified distance between the contour points and the contrast values $CONT_1$ and $CONT_2$ (see FIG. 19):

$$\delta Dist = \max(abs(y1-y2), abs(x1-x2))$$

$$\delta Cont = CONT_1 * CONT_2$$

Two contour points are adjacent when the neighborhood criterion NC:

$$NC := (\delta Dist < Dist\_Threshold) \text{ AND } (\delta Cont > 0)$$

is satisfied.

Since, owing to the implementation of the neighborhood processor, $abs(y1-y2) \leq 1$ and $Dist\_Threshold \geq 1$ this distance measure is simplified to:

$$\delta Dist = abs(x1-x2)$$

The insertion of the contrast threshold value prevents or makes more difficult the combination of contours of different strength. A different distance measure, for example the Euclidean distance, may, of course, also be used instead of the simplified distance.

Figure 15:
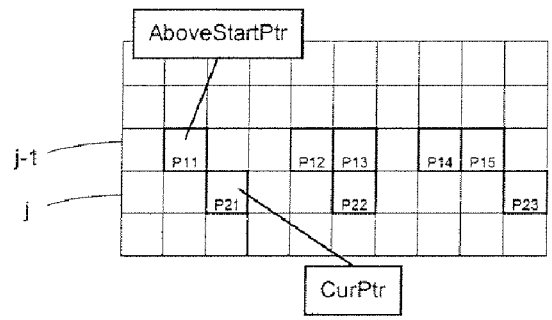
FIGS. 15 to 17 show the method of operation of the neighborhood processor in the network.
Figure 16:
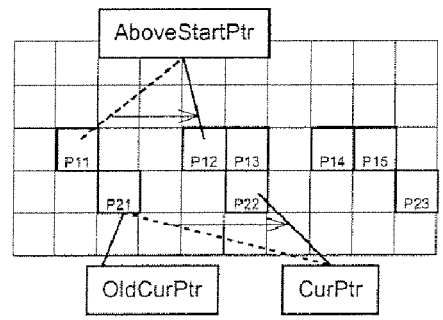
Figure 17:
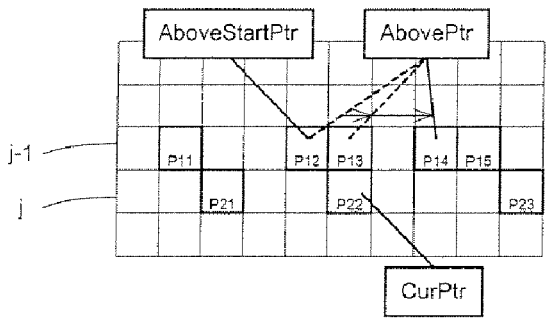

With reference to FIGS. 15 to 17, the neighborhood relationships between contour points 22 in this example are determined as follows.

Once all of the contour points 22 of the last completely transmitted line with the index j have been successfully stored in the ring buffer of the memory M3, the neighborhood is investigated. For this purpose, a Pointer CurPtr in the first direction to be investigated is first of all set to the first contour point in the current line j, and a Pointer AboveStartPtr and a Pointer AbovePtr are set to the first contour point in the line j−1, and the addressed contour points are written to the neighborhood processor 90. The neighborhood processor 90 segments contour points as a function of the neighborhood criterion NC, and enters identical segment numbers when neighborhood is confirmed for adjacent elements. If a contour point has no neighbors with segment numbers which have already been allocated, a new segment number is allocated. If it is found that a single contour point links segments with a different segment number, the entry is made in a coincidence list.

FIGS. 15, 16 and 17 show the method of operation of the neighborhood processor 90 in the network. The points P11, P12 etc. from the previous above line j−1 as well as the points P21, P22 etc. from the current line j include the respective contour point addresses with sub-pixel accuracy, the contrast value CONT as well as the segment number SegNo.

FIG. 15 shows the initial state. The Pointer AboveStartPtr in this case points to P11, the Pointer CurPtr to P21, and the Pointer OldCurPtr is invalid.

FIG. 16 shows the status for the transition to the next point P22 to be processed. The Pointer CurPtr now points to P22, the Pointer OldCurPtr to P21, and the Pointer AboveStartPtr is (iteratively) shifted to P12.

FIG. 17 shows which points are investigated during testing for neighborhood with the line located above: the pointer AbovePtr is initiated with the value of AboveStartPtr, and then runs via P12, P13 and P14.

Figure 18:
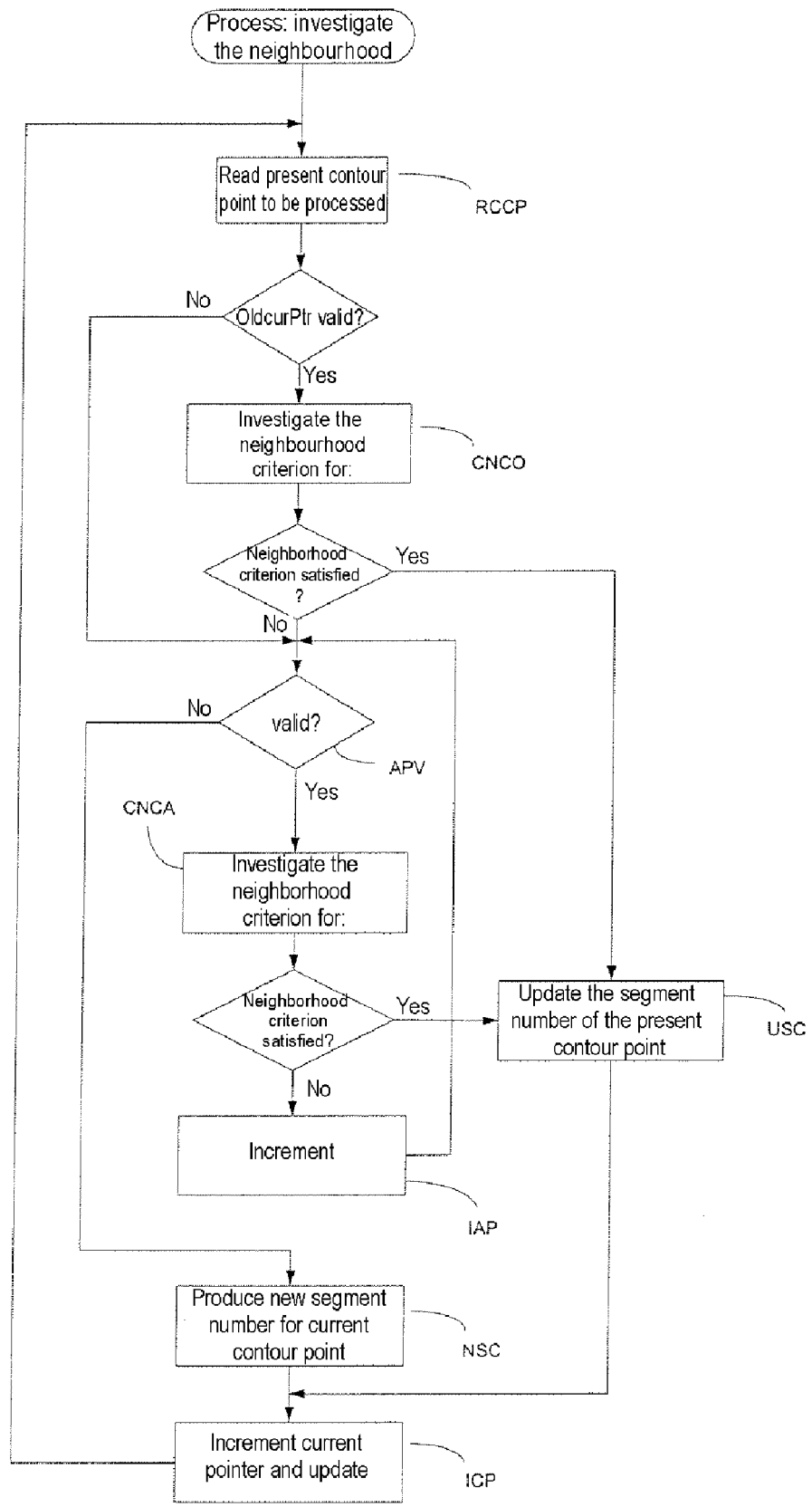
FIG. 18 shows a program flowchart for the distance vector and segment number calculation.
Figure 19:
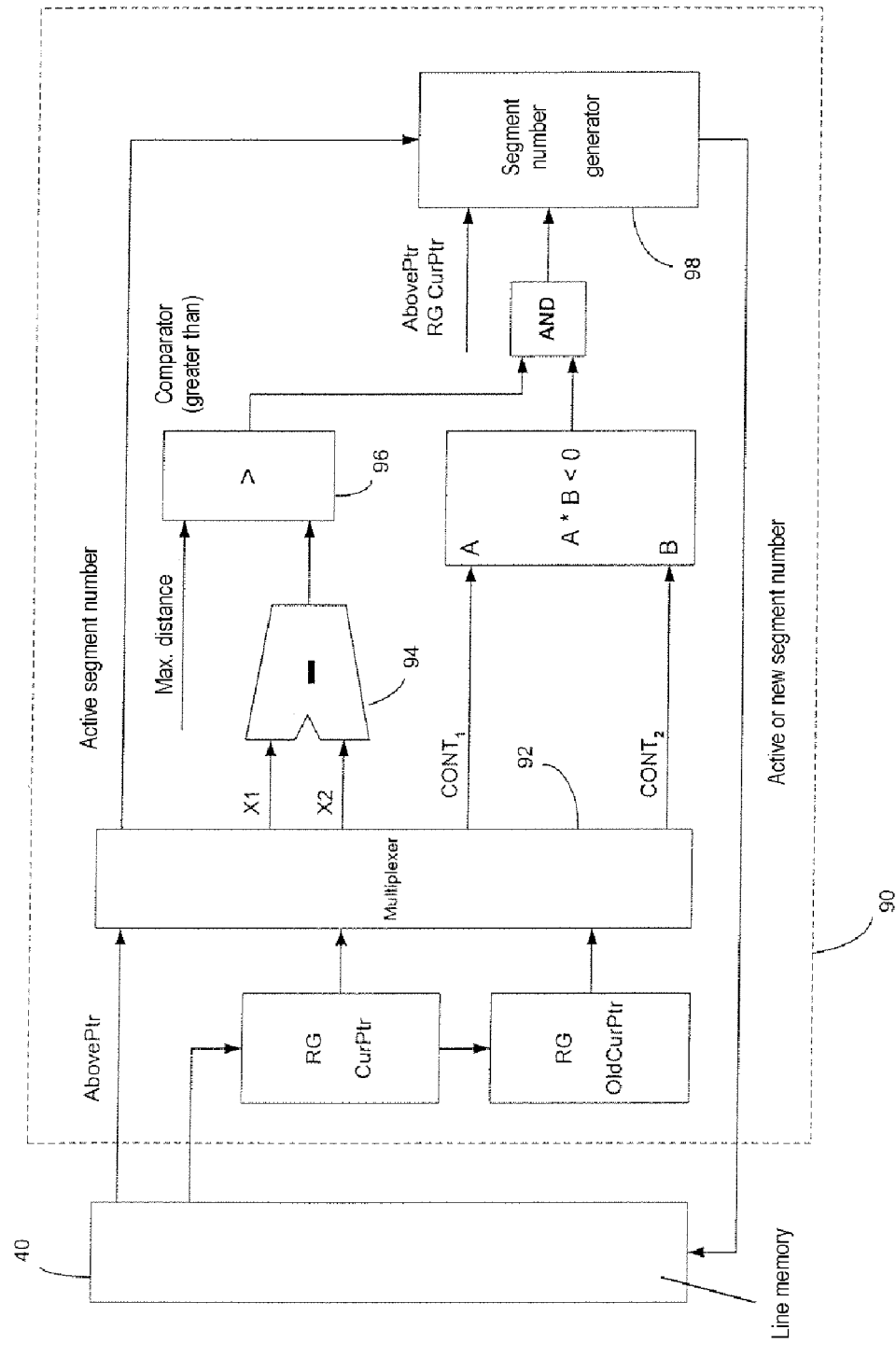
FIG. 19 shows a block diagram of the neighborhood processor.

The hardware implementation of the process of neighborhood investigation follows the program flowchart shown in FIG. 18, and is calculated using the structure shown in FIG. 19.

First of all, the current contour point to be processed is read (Read current contour point record, RCCP), corresponding to CurPtr, as described above.

A check is then carried out to determine whether OldCurPtr is valid. If yes, OldCurPtr and CurPtr are investigated for neighborhood (Check neighborhood criteria for CurPtr/OldCurPtr, CNCO). If the neighborhood criterion NC is satisfied, CurPtr is associated with the segment of OldCurPtr, that is to say the segment number of the current contour point is updated (Update segment number of current contour point, USC).

The process then continues with checking of the neighborhood for points in the line located above (this is not shown in the flowchart, for clarity reasons). This is likewise done when OldCurPtr is invalid or OldCurPtr and CurPtr are not adjacent. In this case, AbovePtr is first of all initialized from the current AboveStartPtr (this is not shown in the flowchart for clarity reasons).

An iteration process is then carried out with this pointer: as long as this is valid (AbovePtr valid, APV), CurPtr is investigated for neighborhood using this (check neighborhood criteria for CurPtr/AbovePtr, CNCA). If they are adjacent, then CurPtr is associated with the segment of AbovePtr (USC). The iteration process is then continued via AbovePtr, provided that the neighborhood candidates have not yet all been investigated (this is not shown in the flowchart for clarity reasons). If CurPtr and AbovePtr are not adjacent, the iteration process is simply continued by incrementation of AbovePtr (Increment Above Pointer, IAP).

If CurPtr has still not received a segment number after the end of the iteration of AbovePtr, a new segment number is produced and is allocated to it (Create new segment number for current contour point, NSC). Finally, the old CurPtr is stored in OldCurPtr and CurPtr is incremented (Increment current pointer and update OldCurent pointer, ICP). This completes the transition to the next contour point to be processed, and the entire procedure is repeated until all of the contour points have been processed.

The two process elements USC and APV will also be explained in more detail in the following text:

USC: when CurPtr is allocated to a segment, two situations can occur:
1. CurPtr still has no segment number. In this case, the segment number of that segment to which the point is intended to be allocated is adopted for CurPtr.
2. CurPtr already has a segment number. In this case, the segment number cannot be transferred. Coincidence information is then entered in CurPtr instead of this, stating that this point is adjacent to the segment with which it should be associated.

APV: the decision as to whether AbovePtr is still valid includes a plurality of criteria: firstly, the point must still belong to the line above CurPtr. Secondly, on the basis of its physical position, it must still be a possible neighborhood candidate (criterion, see above). The nature of the iteration (starting with the first candidate seen from the left and iteration to the right) ensures that AbovePtr follows all the possible points, and only the possible points.

FIG. 8 shows a single contour point, having or comprising a filter direction, coordinates, a contrast measure, a segment number and coincidence information, stored in a 64-bit long data structure in the contour point list CP_long. The splitting of the bits between the individual data items as illustrated in FIG. 8 allows high memory efficiency.

All of the resultant contour points from all of the filter directions are stored in a common continuous list in the memory. In this case, an organization structure is maintained, which is defined by the coordinates of the contour points and the filter direction by means of which the contour point has been produced. The points are stored in the form of pixel lines, in each case from left to right, starting with the top left-hand corner of the image, with contour points having the same pixel coordinates being stored separately on the basis of the filter directions.

A point A is in this case positioned in front of a point B in the memory when and only when: int(A.Y)<int(B.Y) or (int (A.Y)=int(B.Y) and (int(A.X)<int(B.X) or (int(A.X)=int (B.X) and A.DIR<B.DIR))), where A.X or A.Y, respectively, marks the X or Y coordinate of the point A, int( ) denotes the entire pixel component without the sub-pixel component, and A.DIR and B.DIR respectively denote the filter direction. The end of the list is marked by an entry in which all of the bits are set to 0.

FIG. 9 shows an example of a hexadecimal contour point list CP_long, in the form of a so-called "Hexdump", with two contour points per line.

The segment number determined in this way and the coincidence information are likewise written to the data structure CP_long. Once the segment numbers for a complete line have been determined, the relevant line is written via the memory interface 34 to the memory M1. This completes the second main process of segmentation.

In terms of hardware, the neighborhood processor 90 which is illustrated in detail in FIG. 19 has two registers RG CurPtr and RG OldCurPtr, to which the corresponding contour points are written from the line memory 40. These registers are connected directly to a multiplexer 92, in the same way as the line memory.

The contour point separation is determined by means of a subtraction element 94, and is subjected by means of a comparator 96 to a threshold value analysis with a maximum distance value. The "AND" operation explained above $$NC := (\delta\ Dist < Dist\_Threshold)\ AND\ (\delta\ Cont > 0)$$

is then carried out, and the segment number is produced by a segment number generator 98, so that the neighborhood criterion is a function of the contour point separation and/or the contrast. The segment number generator 98 is illustrated in detail in FIG. 20.

Third Main Process

The third main process, in which the statistical moments S are calculated, is carried out with a time delay after the second main process.

During the process of writing the memory M1, a contour point sequence passes through a computation unit, defined as a statistical processor, suitable for determination of the statistical moments.

The X and Y coordinates as well as the contrast CONT are copied from the structure of the contour point and are accumulated in accordance with the equations for moment calculation. For this purpose, a structure with moments S, in this example up to the second order, but for specific applications also a higher order, is stored in the memory M3 as follows:

$$S\_x := \sum_{i=1}^{n} x_i$$

$$S\_xx := \sum_{i=1}^{n} x_i^2$$

$$S\_y := \sum_{i=1}^{n} y_i$$

$$S\_yy := \sum_{i=1}^{n} y_i^2$$

$$S\_xy := \sum_{i=1}^{n} x_i y_i$$

$$S\_cont := \sum_{i=1}^{n} CONT_i$$

$$S2 := n\left(\sum_{i=1}^{n} x_i^2\right) - \left(\sum_{i=1}^{n} x_i\right)^2$$

$$S4 := n\left(\sum_{i=1}^{n} y_i^2\right) - \left(\sum_{i=1}^{n} y_i\right)^2$$

$$S6 := n\left(\sum_{i=1}^{n} x_i y_i\right) - \left(\sum_{i=1}^{n} x_i\right)\left(\sum_{i=1}^{n} y_i\right)$$

Obj_Moments$_j$ := [$n$, S_x, S_y, S_2, S_4, S_6, S_cont]

A calculation up to the third order is particularly advantageous for identification of non-linear, for example curved, edges or structures. A calculation even as far as the fourth order appears to be possible, with appropriate hardware development, with the concept according to the invention.

The structures are formed for each direction Dir=0°, 45°, 90° and 135° by multipliers/accumulators in the form of a moment vector, and are stored in a list Obj_Moments[i] calculated as above. This list is stored via an interface that is not shown and can be internally compressed further, or can be read directly by a microcomputer. The list Obj_Moments[i] has a considerably smaller data volume than the original gray-scale value image. The compression rate reaches values of about 1:200 to 1:5000 with respect to the original image of the imaging system or of the CCD camera, depending on the image content, without this resulting in any data losses for the network approximation.

For the further processing, it is expedient to calculate the gradients of the best straight lines through the segmented contour points as a difference relating to the four scanning directions.

Figure 22:
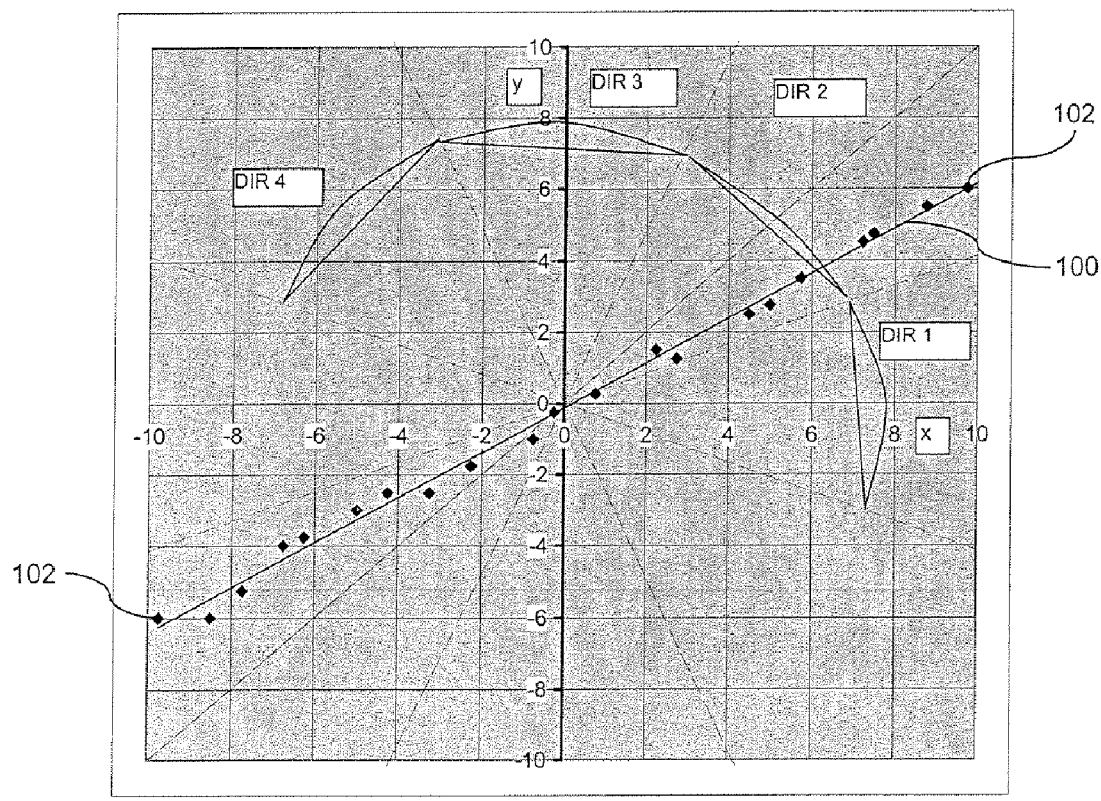
FIG. 22 shows an illustration of a contour with four scanning directions.

FIG. 22 shows one implementation, with four directions DIR1 to DIR4. The directions DIR1 to DIR4 are rotated through 90° with respect to the scanning directions. The contour points 22 of one object—in this case a digital straight path 100—are marked as rhomboids 102. This path has the rise m=0.65 corresponding to 33° in the Cartesian coordinate system used in the example. In this example, the path lies within the direction sector DIR2, and records paths in the angle range <22.5° . . . 67.5°> in the Cartesian coordinate system.

One particularly simple hardware implementation for the approximation to the best straight line 100 is obtained by directly calculating the difference gradient Δm between the direction of the best straight line 100 and the respective main direction. The difference gradients are annotated m_0, m_45, m_90 and m_135 and are calculated as follows, approximated by means of Taylor series:

DIR1, < −22.5° . . . 22.5° > :

$$x := \frac{S6}{S2 - S4}$$

m_0 := .408 $x^5$ − .708 $x^3$ + .983 $x$

DIR2, < 22.5° . . . 67.5° > :

$$x := \frac{S2 - S4}{S6}$$

m_45 := .000464 $x^5$ − .0117 $x^3$ + .247 $x$

DIR3, < 67.5° . . . 112.5° > :

$$x := \frac{S6}{S2 - S4}$$

m_90 := .403 $x^5$ − .708 $x^3$ + .983 $x$

DIR4, < 112.5° . . . 157.5° > :

$$x := \frac{S2 - S4}{S6}$$

m_135 := .000464 $x^5$ − .0117 $x^3$ + .247 $x$

Furthermore, the centroids (x0, y0) of the digital paths are calculated using:

$$x0 := \frac{S\_x}{n}$$

$$y0 := \frac{S\_y}{n}$$

The results of the calculation are entered in a feature list Features$_i$, which is created separately for each direction.

Features$_i$ := [[x0,y0], n, m_DIR, S_cont]

An object filter is then used which, in particular, suppresses noise, paints identical segments which have been found in different directions and, when required, combines segments on the basis of the coincidence information.

In the simplest case, the object filter criterion ($n$>2) AND ($abs$(m_DIR)<arctan (22.5°))

can be used for this purpose.

Figure 10:
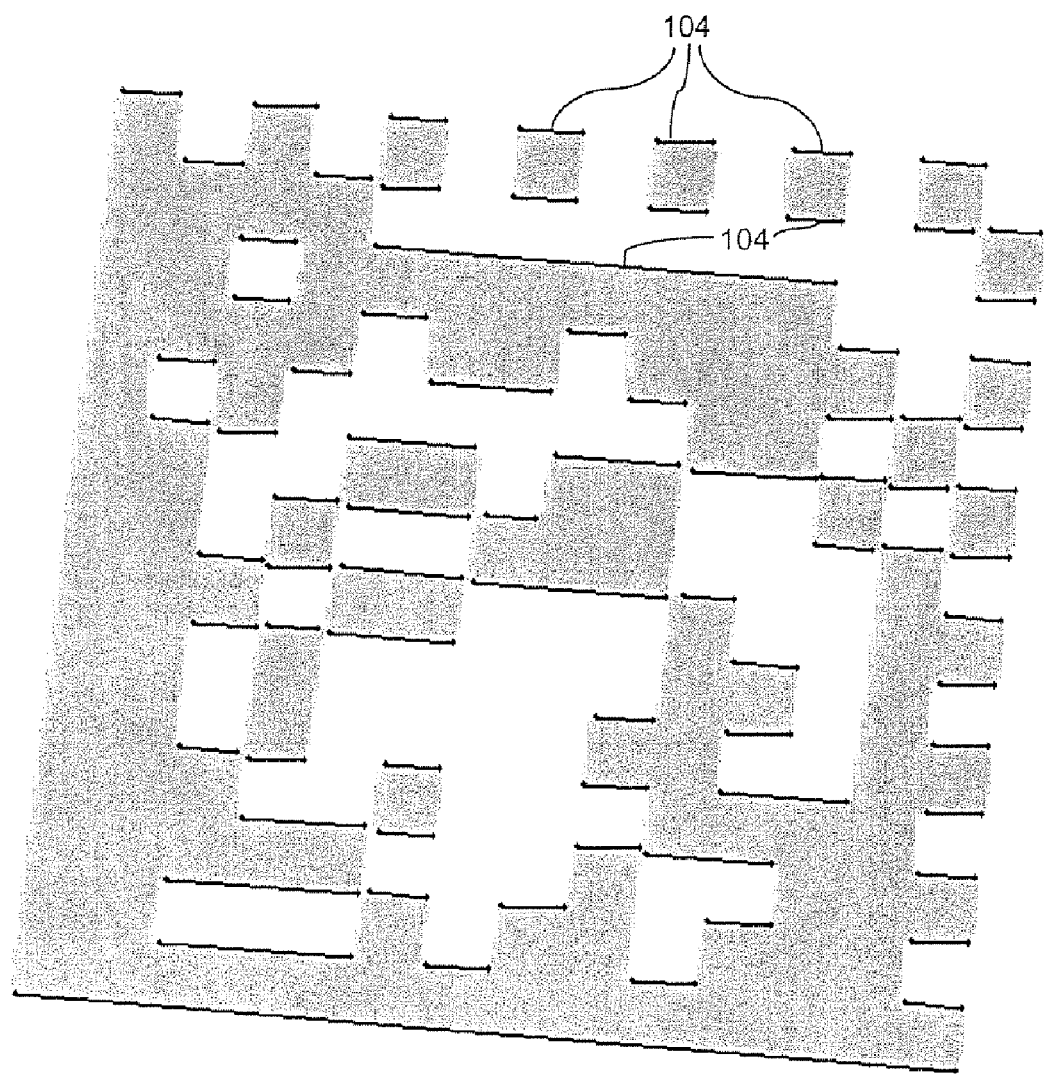
FIG. 10 shows an illustration in the form of a graph on the approximated and filtered digital paths.

FIG. 10 shows an illustration in the form of a graph of the approximated and filtered digital paths 104.

The resultant segments are combined with sub-pixel quality to form objects, depending on the application to be implemented. For one-dimensional and two-dimensional barcodes, these are initially network structures, which are then used for scanning the gray-scale values of the code. The method which is carried out on the image processing system according to the invention can be implemented omnidirectionally in video real time. The recording of all the available contours allows the network to be locally reconstructed, so that it is possible to read even damaged codes or codes distorted by parallex. The computation performance of the microprocessor used is adequate for the network reconstruction and decoding proposed here in real time.

The high-speed image processing described above, in particular segmentation of gray-scale value images with sub-pixel resolution is largely generally applicable and can also be used for a large number of other applications, for example in industrial metrology, robot control, for inspection tasks and for high-speed segmentation tasks in the logistics fields (reading scripts in gray-scale value images, reading codes) and for high-speed automatic object identification, for example in the point-of-sale (POS) area.

One application of particular interest is the identification of biometric forms and structures, for example for fingerprint, iris and facial identification.

It is obvious to a person skilled in the art that the embodiments described above should be regarded only as examples, and can be modified in many ways without departing from the spirit of the invention.

The invention claimed is:

1. An image processing system (1) for omnidirectional reading of optical patterns, said system comprising:
    an imaging system (2) for provision of image data;
    an analog/digital converter (4) for conversion of the image data to digital image data (12);
    a processing device (6) for processing of the digital image data (12);
    a computation device (8); and
    a plurality of convolvers for convolution of the digital image data;
    wherein a contour point (22) is entered in a contour point list (20) in a memory at least with the values X position, Y position and contrast value (P(X,Y, contrast value)) precisely
    when a) the convolution results (Fx_0, Fx_1) of the operands which are associated with one convolver pair (54) have different mathematical signs and the difference between the operands in the predetermined direction exceeds a threshold value, or
    when b) one and only one operand is equal to zero, and the difference between the operands in the predetermined direction exceeds a threshold value (Fx_Threshold).

2. The image processing system (1) as claimed in claim 1, wherein the digital image data (12) is convolved by means of the plurality of convolvers which operate in parallel in time and/or operate using the time-division multiplexing method.

3. The image processing system (1) as claimed in claim 1, wherein the digital image data is formed from an incoming image datastream (12), and the incoming image datastream (12) is convolved by means of the plurality of convolvers which operate in parallel in time and/or operate using the time-division multiplexing method.

4. The image processing system (1) as claimed in claim 1, wherein the image data represents an at least two-dimensional image, and the convolvers operate in different directions (0°, 45°, 90°, 135°).

5. The image processing system (1) as claimed in claim 1, wherein the convolvers comprise a plurality of pairs of convolvers (54), and the digital image data (12) is convolved (Fx_0, Fx_1) by means of the plurality of pairs of convolvers (54) which operate in parallel in time and/or operate using the time-division multiplexing method, and wherein the two convolvers (54) in one pair operate in the same direction (0°, 45°, 90°, 135°).

6. The image processing system (1) as claimed in claim 1, wherein the digital image data (12) is convolved (Fx_0, Fx_1) by means of four pairs of convolvers (54), which operate in parallel in time and/or using the time-division multiplexing method, and operate in four directions (0°, 45°, 90°, 135°) which are each rotated through 45°.

7. The image processing system (1) as claimed in claim 1, wherein the digital image data (12) is convolved (Fx_0, Fx_1) within an n×n, in particular 6×6 environment.

8. The image processing system (1) as claimed in claim 1, wherein contour points (22) are produced by means of the convolution results (Fx_0, Fx_1), and a subset of the contour points (22) is entered in a contour point list (20).

9. The image processing system (1) as claimed in claim 1, wherein operands for a logical decision are determined by means of the convolution results (Fx_0, Fx_1) from the convolvers (54), and wherein the image processing system (1) has a decision unit (60) which provides a logical variable (B[k]) as a function of the operands, and a contour point (22) is entered in a contour point list (20) as a function of the logical variable (B[k]).

10. The image processing system (1) as claimed in claim 1, wherein a contour point (22) is entered in a contour point list (20) as a function of the logical variable (B[k]) at least with the values X position, Y position and the associated contrast value (CONT).

11. The image processing system (1) as claimed in claim 1, wherein the logical variable is a Boolean vector B[k] with a plurality of logical variables (k=1,2, . . . ), and
    wherein a first of the logical variables B[1] depends on a threshold value of the absolute magnitude of the difference between the convolution results (Fx_0, Fx_1) which are associated with one convolver pair (54) being exceeded,
    a second of the logical variables B[2] depends on a mathematical-sign difference between the convolution results (Fx_0, Fx_1) which are associated with one convolver pair (54),
    a third of the logical variables B[4] depends on whether one of the convolution results (Fx_0, Fx_1) which are associated with one convolver pair (54) is equal to zero, and
    wherein a contour point (22) is entered (Contour_Point_valid) in a contour point list (20) as a function of a logic operation on the first, second and/or third logical variables.

12. The image processing system (1) as claimed in claim 11, wherein the logic operation comprises at least the Boolean operation:
    B[1] AND {B[2] OR B[4]}, and the contour point (22) is entered in the contour point list (20) when the result of the logic operation is TRUE.

13. The image processing system (1) as claimed in claim 1, wherein one convolver pair (54) is provided for each direction (0°, 45°, 90°, 135°), and one contour point list (20) is in each case created for each direction.

14. An image processing system (1) for omnidirectional reading of optical patterns, said system comprising:
   an imaging system (2) for provision of image data;
   an analog/digital converter (4) for conversion of image data which has been provided by the imaging system to digital image data (12);
   a processing device (6) for processing the digital image data;
   a computation device (8); and
   a neighborhood processor (90) for reading and linking contour points (22);
   wherein the neighborhood processor (90) uses a neighborhood criterion (NC) to define neighborhoods, to segment contour points (22) and/or to enter the segment numbers and coincidences in a contour point list (20); and
   a plurality of convolvers for convolution of the digital image data;
   wherein the contour points (22) is entered in the contour point list (20) in a memory at least with the values X position, Y position, and contrast value (P(X,Y, contrast value)) precisely
      when a) convolution results (Fx_0, Fx_1) of the operands that are associated with one convolver pair (54) have different mathematical signs and the difference between the operands in a predetermined direction exceeds a threshold value, or
      when b) one and only one operand is equal to zero, and the difference between the operands in the predetermined direction exceeds a threshold value (Fx_Threshold).

15. The image processing system (1) as claimed in claim 14, wherein, in a second main process which is delayed in time with respect to a first main process, contour points (22, P(X,Y, contrast value)) of adjacent lines and/or columns (j, j−1) are read by the neighborhood processor and are then linked and are entered into the contour point list (20) when a neighborhood criterion (NC) is satisfied.

16. The image processing system (1) as claimed in claim 15, wherein the neighborhood is a function of the contour point separation and/or the contrast values (CONT) of the adjacent contour points (22).

17. An image processing system (1) for omnidirectional reading of optical patterns, said system comprising:
   an imaging system (2) for provision of image data;
   an analog/digital converter (4) for conversion of image data which has been provided by the imaging system to digital image data (12);
   a processing device (6) for processing the digital image data, wherein the digital image data is an incoming image datastream (12) and, in a first main process in the processing device (6), the incoming image datastream (12) is convolved within an n×n environment by means of a plurality of convolvers which operate in parallel in time and/or using the time-division multiplexing method and which operate in respectively rotated directions (0°, 45°, 90°, 135°);
   a computation device (8), by means of which, in a second main process which is delayed in time with respect to the first main process, contour points (22, P(X,Y, contrast value)) of adjacent lines and/or columns (j, j−1) are read by a neighborhood processor and are then linked and are entered into a contour point list (20) when a neighborhood criterion (NC) is satisfied; and
   a statistical processor for reading a segment list in the form of a contour point list to which at least one segment number has been added, wherein in a third main process which is delayed in time with respect to the second main process, the segment list is read by the statistical processor, and wherein the statistical moments (S) are calculated in a multiplier/accumulator as far as the second, third and/or fourth order for the objects in each direction (DIR1 to DIR4);
   wherein the plurality of convolvers are for convolution of the digital image data; and
   wherein the contour points (22) is entered in the contour point list (20) in a memory at least with the values X position, Y position and contrast value (P(X,Y, contrast value)) precisely
      when a) the convolution results (Fx_0, Fx_1) of the operands that are associated with one convolver pair (54) have different mathematical signs and the difference between the operands in the predetermined direction exceeds a threshold value, or
      when b) one and only one operand is equal to zero, and the difference between the operands in the predetermined direction exceeds a threshold value (Fx_Threshold).

18. The image processing system (1) as claimed in claim 17, wherein an object association is carried out on the contour points (22), preferably in the processing device (6).

19. The image processing system (1) as claimed in claim 17, wherein, in a third main process which is delayed in time with respect to the second main process, the segment list is read by the statistical processor, and wherein the statistical moments (S) are calculated for the objects in each direction (DIR1 to DIR4).

20. The image processing system (1) as claimed in claim 17, wherein the image data is supplied as an image datastream (12) to the processing device (6), and the contour point list (20) is actually produced while the image datastream (12) is being supplied.

21. The image processing system (1) as claimed in claim 17, wherein partitioned contour point lists (20) which have been sorted on the basis of directions are stored in one or more memories with respect to the delay time of the image.

22. The image processing system (1) as claimed in claim 17, wherein a pixel interpolation process is carried out in order to reduce the quantization or digitization noise.

23. The image processing system (1) as claimed in claim 17, wherein the contour points (22) are stored with sub-pixel resolution in the contour point list (20).

24. The image processing system (1) as claimed in claim 17, wherein at least one gradient (Grad_1, Grad_2) is calculated for each direction (DIR1 to DIR4), and is preferably stored in the contour point list.

25. The image processing system (1) as claimed in claim 17, wherein the difference between two convolution results (Fx_0−Fx_1) is calculated, and is preferably stored in the contour point list (20).

26. The image processing system (1) as claimed in claim 17, wherein a gradient or a plurality of gradients (Grad_1, Grad_2) and the difference between two convolution results (Fx_0−Fx_1) are calculated in the respective filter direction with respect to the delay time of the image, and one of the gradients and/or said difference is stored as a contrast (CONTx) within the contour point list (20).

27. The image processing system (1) as claimed in claim 17, wherein the contents of the contour point list (20) for each direction are copied to a memory (M1).

28. The image processing system (1) as claimed in claim 17, wherein the contents of the contour point list (20) are copied from the processing device (6) for each direction after each line of the imaging system to a preferably external memory (M1).

29. The image processing system (1) as claimed in claim 17, wherein a segmentation process is carried out in the processing device (6).

30. The image processing system (1) as claimed in claim 17, wherein an interface (34) of a data storage unit (36) copies the current line from the contour point list (20), after processing progress of a neighborhood processor (90), separately on the basis of directions to a general purpose memory (M2) of the neighborhood processor (90).

31. The image processing system (1) as claimed in claim 17, wherein a statistical processor calculates moments (S) on the basis of the contour point list (20).

32. The image processing system (1) as claimed in claim 17, wherein the image processing system (1) outputs data via an output interface, in the following output format:

[Direction(DIR), Moments(S), Segment number (SegNo), Contrast(CONT)].

33. The image processing system (1) as claimed in claim 17, wherein an illumination device is included.

* * * * *

UNITED STATES PATENT AND TRADEMARK OFFICE
CERTIFICATE OF CORRECTION

Page 1 of 1

PATENT NO. : 7,978,914 B2
APPLICATION NO. : 10/597554
DATED : July 12, 2011
INVENTOR(S) : Beikirch et al.

It is certified that error appears in the above-identified patent and that said Letters Patent is hereby corrected as shown below:

Title Page, Item (75) Inventors: should read
--Lars Beikirch, Pirna (DE); Sergej Fedorenko, Petersburg (RU); Dittmar Schwarz, Dresden (DE); Joachim Ihlefeld, Dresden (DE); Lutz Wenert, Dresden (DE)--

Signed and Sealed this
Eighth Day of November, 2011

David J. Kappos
*Director of the United States Patent and Trademark Office*